(12) United States Patent
Bhanote

(10) Patent No.: US 7,756,829 B2
(45) Date of Patent: Jul. 13, 2010

(54) METHOD AND APPARATUS FOR MOBILE DATA COLLECTION AND MANAGEMENT

(76) Inventor: Sandeep Bhanote, 50 Cragwood Rd., South Plainfield, NJ (US) 07080

( * ) Notice: Subject to any disclaimer, the term of this patent is extended or adjusted under 35 U.S.C. 154(b) by 315 days.

(21) Appl. No.: 11/787,538

(22) Filed: Apr. 17, 2007

(65) Prior Publication Data

US 2007/0260475 A1 Nov. 8, 2007

Related U.S. Application Data

(60) Provisional application No. 60/792,927, filed on Apr. 18, 2006.

(51) Int. Cl.
  *G06F 17/00* (2006.01)
  *G06F 7/00* (2006.01)
(52) U.S. Cl. ...................................................... 707/634
(58) Field of Classification Search ........................ None
  See application file for complete search history.

(56) References Cited

U.S. PATENT DOCUMENTS

| | | | |
|---|---|---|---|
| 6,088,706 A | 7/2000 | Hild | |
| 6,112,206 A | 8/2000 | Morris et al. | |
| 6,694,359 B1 | 2/2004 | Morris et al. | |
| 6,816,944 B2 | 11/2004 | Peng | |
| 6,823,461 B2 | 11/2004 | Lakshmi Narayanan et al. | |
| 6,871,140 B1 | 3/2005 | Florance et al. | |
| 6,944,271 B2 | 9/2005 | Yakura et al. | |
| 6,959,436 B2 | 10/2005 | Peng | |
| 7,034,691 B1 | 4/2006 | Rapaport et al. | |
| 7,254,559 B2 | 8/2007 | Florance et al. | |
| 7,260,389 B2 | 8/2007 | Allen et al. | |
| 7,313,782 B2 | 12/2007 | Lurie et al. | |
| 7,331,035 B2 | 2/2008 | Loos et al. | |
| 7,366,460 B2 | 4/2008 | O'Farrell et al. | |
| 7,436,311 B2 | 10/2008 | Rapaport et al. | |
| 7,454,443 B2 | 11/2008 | Ram et al. | |
| 2005/0125273 A1* | 6/2005 | Simons et al. ................. 705/8 |
| 2007/0061199 A1* | 3/2007 | Montgomery et al. ......... 705/14 |
| 2007/0185986 A1* | 8/2007 | Griffin et al. ................ 709/224 |

* cited by examiner

*Primary Examiner*—Uyen T. Le
(74) *Attorney, Agent, or Firm*—John J. Skinner, Jr.; Michelman & Robinson, LLP

(57) ABSTRACT

A method and apparatus for a middleware approach to initializing and updating required data entry fields, pushing such required data entry fields to mobile devices and applications, collecting entered data from such mobile devices, and the synchronizing and integrating of the data is presented. A "form builder" software component allows for the creation of easy to read and use data entry forms by company management. A "web application" software component allows for the forms to then be distributed via electronic and/or wireless means to mobile client devices. A "synchronization server" software component allows for two-way communication, storage and conflict resolution (versioning) of the collected data. An "integration server" software component allows for external access to the collected and versioned data and modeling/mapping of such data. Thus seamless data entry, collection, updating, conflict resolution, versioning, storage, access and utilization is available.

19 Claims, 25 Drawing Sheets

(STEP 112 - Choose Template Form Screen Shot)

(Step 122 – New Survey Creation Screen Shot)

(Step 122 - Add Dataset Screen Shot)

(Step 122 – Create Dataset Questions Screen Shot)

(STEP 126 - SET OBJECT PROPERTIES IN TEMPLATE FORM SCREEN SHOT)

(STEP 126 - SET OBJECT PROPERTIES IN TEMPLATE FORM SCREEN SHOT)

(Step 126 – Attributes Appearance Screen Shot)

(Step 132 – Script Wizard Intro Screen Shot)

(Step 220 – Add User to Specific Survey Screen Shot)

(Step 220 – Add User to Specific Survey Screen Shot)

(Step 230 – Search Surveys Result Screen Shot)

(Step 250 – Reports Home Screen Shot)

(STEP 360 - Synchronization Status Screen Shot)

METHOD AND APPARATUS FOR MOBILE DATA COLLECTION AND MANAGEMENT

PRIOR PROVISIONAL PATENT APPLICATION

The present application claims the benefit of U.S. Provisional Application No. 60/792,927 filed Apr. 18, 2006, the disclosure of which is hereby incorporated by reference.

FIELD OF THE INVENTION

The present invention relates to a method and apparatus of creating and distributing forms, surveys and applications electronically to mobile users and of the collection and management of the data thereafter, and, more particularly, to a method and apparatus for building required template forms, data entry surveys and applications with complex business rules, distributing such forms, surveys and applications, along with user specific content/data, via electronic means such as the internet, and the collection, synchronization and integration of entered data for utilization.

BACKGROUND OF THE INVENTION

In a client/customer oriented world, servicing the client/customer through the efficient, timely and up-to-date collection and management of data is more important than ever. As organizations look for ever smaller edges over the competition, it is a must to increase their productivity in field data collection and analysis. One such edge can be had by the streamlining of the movement of client/customer data along with complex business rules, work flow and validations from the organizational enterprise to the field and vice versa. Being able to disseminate data or information efficiently are measurable ways to lower costs, increase revenues, optimize productivity and improve process management.

Accordingly, once an organization has decided to implement a new solution for their data collection and management needs, certain necessary factors need to be considered. While specific tools provided to organizations differ among the configurable mobile platform products, there is a standard set of criteria any mobile platform provider should be able to deliver. Some of these elements include:

- A strong architecture and robust feature set that can deploy applications to a mobile taskforce quickly, that is in days/weeks rather than months/years.
- The ability to create an organization's mobile application once and then deploy it to various mobile devices such as SmartPhones, PDAs or Tablets. This way the organization is never tied to one technology.
- Implementation of a technology that is proven in the real world and can be rapidly deployed.
- Solutions should be easy to use by both executives and non-professional workers. Thus, a low learning curve is necessary.
- The ability to migrate all existing business rules/logic and validation from a backend system to the mobile application, therefore decreasing any learning curve and increasing productivity.

However, it is no longer enough to simply base decisions on a features list a solution offers, but decisions must also now be based on the technology and architecture that is behind the solution.

Currently, many software developers and business organizations are intrigued by the simple system architecture of what is referred to as a "thin client". The reason being is that deployment and updates to the application are fairly simple since the application would reside on a web server and use a browser on the mobile client device to access the same application. The downside of this approach is that this solution would require a constant wireless connection in order for users to access the application, which may not be feasible in many environments.

Alternatively, a "smart client" system architecture model is when the application as well as the data, business rules and validations, all reside locally on the mobile client device. Data exchange is periodic and thus eliminates the need for a constant wireless connection.

The table below outlines the pros and cons of each approach to the system architecture model:

|      | Smart Client | Thin Client |
| --- | --- | --- |
| Pros | Productivity since data resides locally | Quick Time to Market |
|      | No Lag Time | Easy Updates |
|      | Security | Portability |
|      | Conserve Battery Power | Security |
| Cons | Slower Time to market | Productivity goes down as connectivity goes down |
|      | Not as Portable | Frustration of response time if connectivity goes down |
|      |  | More wireless activity will consume more battery life |

After reviewing the pros and cons it can be seen that the "thin client" approach will definitely lead to a quicker deployment and easier management of the solution, but the lack of productivity and acceptance by end users can result in a lack of or negative return on investment.

Thus, as can be seen, problems exist with each of the system architecture model approaches and the resultant "thin" or "smart" client approaches. If a solution offered a way to minimize the time to market as well as the effort required to support future updates, then the cons of a "smart client" would nearly disappear and the pros of such a solution would far outweigh those of a "thin client".

SUMMARY OF THE INVENTION

Accordingly, the present invention is directed to providing a method and apparatus for a data collection and management system architecture that combines the best of both client approaches. Such is accomplished by the present invention by providing an end to end solution that puts the power of developing robust applications not only in the hands of the software developers, but in the hands of the business users as well.

The present invention allows the full life cycle, that is, the creation, deployment, management and data analysis of an application and all related business processes to be simplified through various components. Paper forms are converted into a configurable mobile application through utilization of the present invention's "form builder" component. The component has built in wizards that allow an end user to achieve the creation of applications that need sophisticated filters, logic, jump patterns and complex business rules without the knowledge of programming. Thus organizations can simply "configure" their mobile applications as opposed to having to "develop" them. This significantly lowers cost and risk associated with a point or custom solution.

Additionally, the present invention also allows mobile workers to collect data via the "mobile client" device component and to synchronize the collection of such data to the organization through the "synchronization server" component. In this manner then access to organizational data to and from the point of capture is allowed. It also allows the mobile worker to receive any kind of data (work history, schedule, reference material, alerts, etc) on the device from the enterprise, on demand or based on rules defined on the server.

Additionally, the present invention allows for external feeds from hardware attachments or hardware device features built into the mobile device (e.g., GPS, photo capture, barcode scanner and RFID) that, through the "integration server" component, can be integrated into the system.

The present invention, including its features and advantages, will become more apparent from the following detailed description with reference to the accompanying drawings.

DETAILED DESCRIPTION

FIGS. 1 through 21 illustrate a method and apparatus for a data collection and management system by which means template forms, data collection surveys and applications with complex business rules, along with user specific content/data, can be electronically created and distributed to mobile devices, and the data then collected and/or modified, stored, versioned, synchronized and managed.

Figure 1:
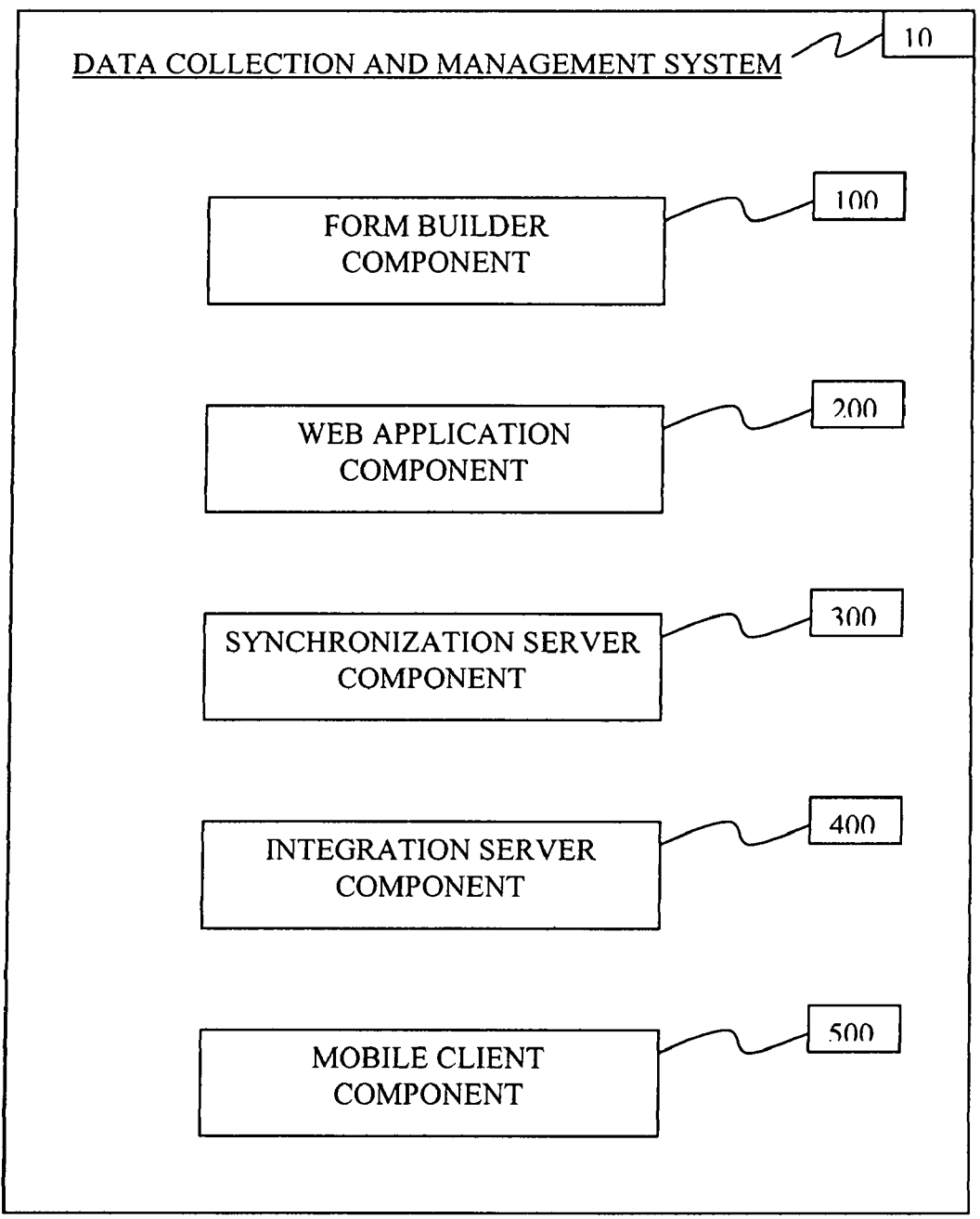
FIG. 1 is an illustration of an overview diagram of the various middleware components of a mobile data collection and management system, according to an embodiment of the present invention.

Referring now specifically to FIG. 1, the present invention's end to end solution 10 consists of five main components, that is: a Form Builder 100, a Web Application 200, a Synchronization Server 300, an Integration Server 400 and a Mobile Client 500. These five components are interconnected but, depending on the function to be performed, all don't necessarily need to be used together in performing the system's functions. Each component will be discussed in detail below, but as a brief overview each has a general function of:

Form Builder 100: the form builder component allows for the creation of powerful forms/surveys/applications, retaining all business rules and validations, into which data can be entered;

Web Application 200: the web application allows for management of users, forms and data;

Synchronization Server 300: the synchronization server allows for a 2 way transport method as between the handheld devices in the field and the system itself;

Integration Server 400: the integration server allows for a 2 way transport method as between the system and any external data sources; and Mobile Client 500: the mobile client allows for collection of data on various handheld devices.

Figure 2:
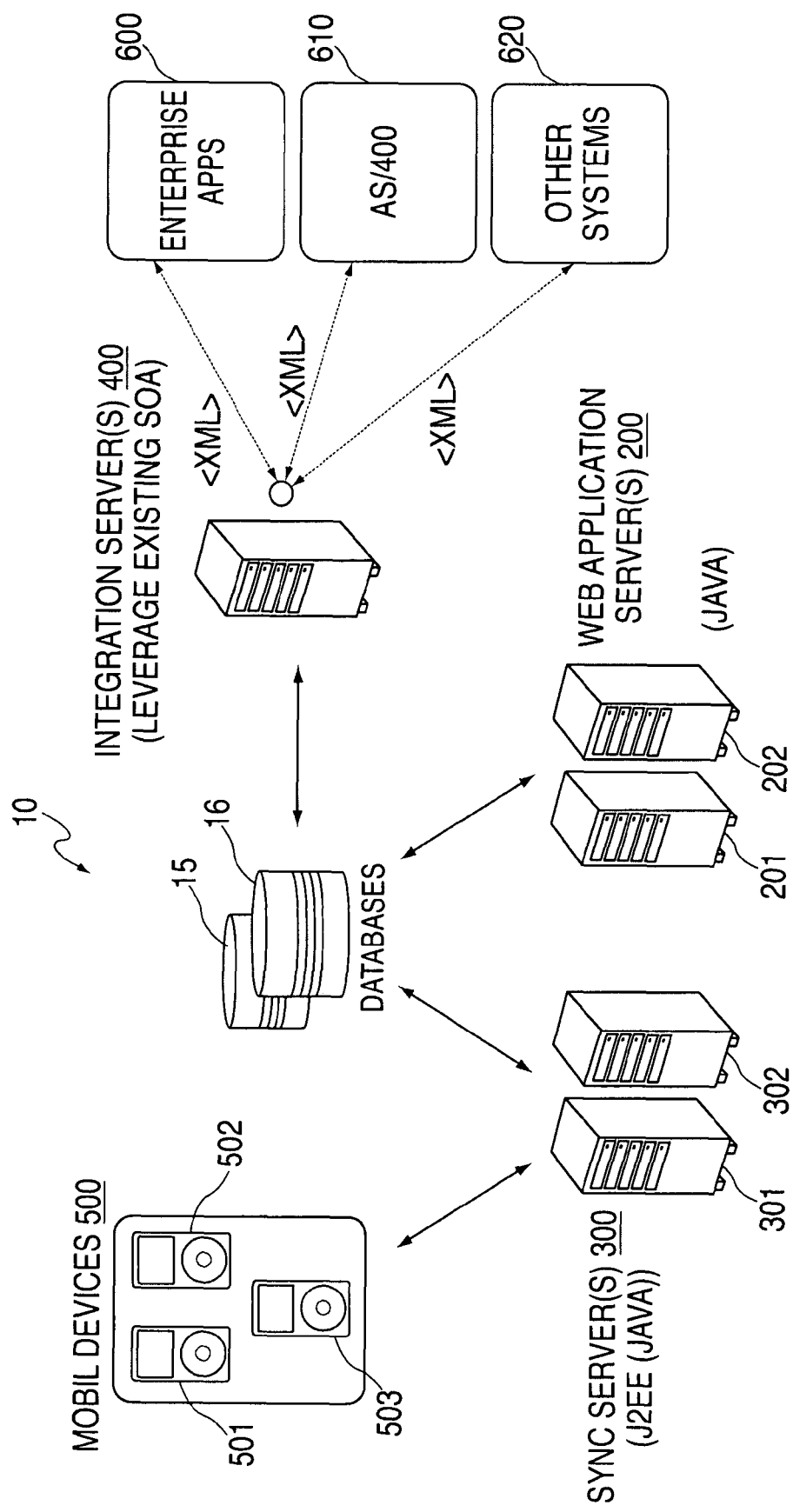
FIG. 2 is an illustration of an implementation hardware architecture of a data collection/management network platform of a mobile data collection and management system, according to an embodiment of the present invention.
Figure 3:
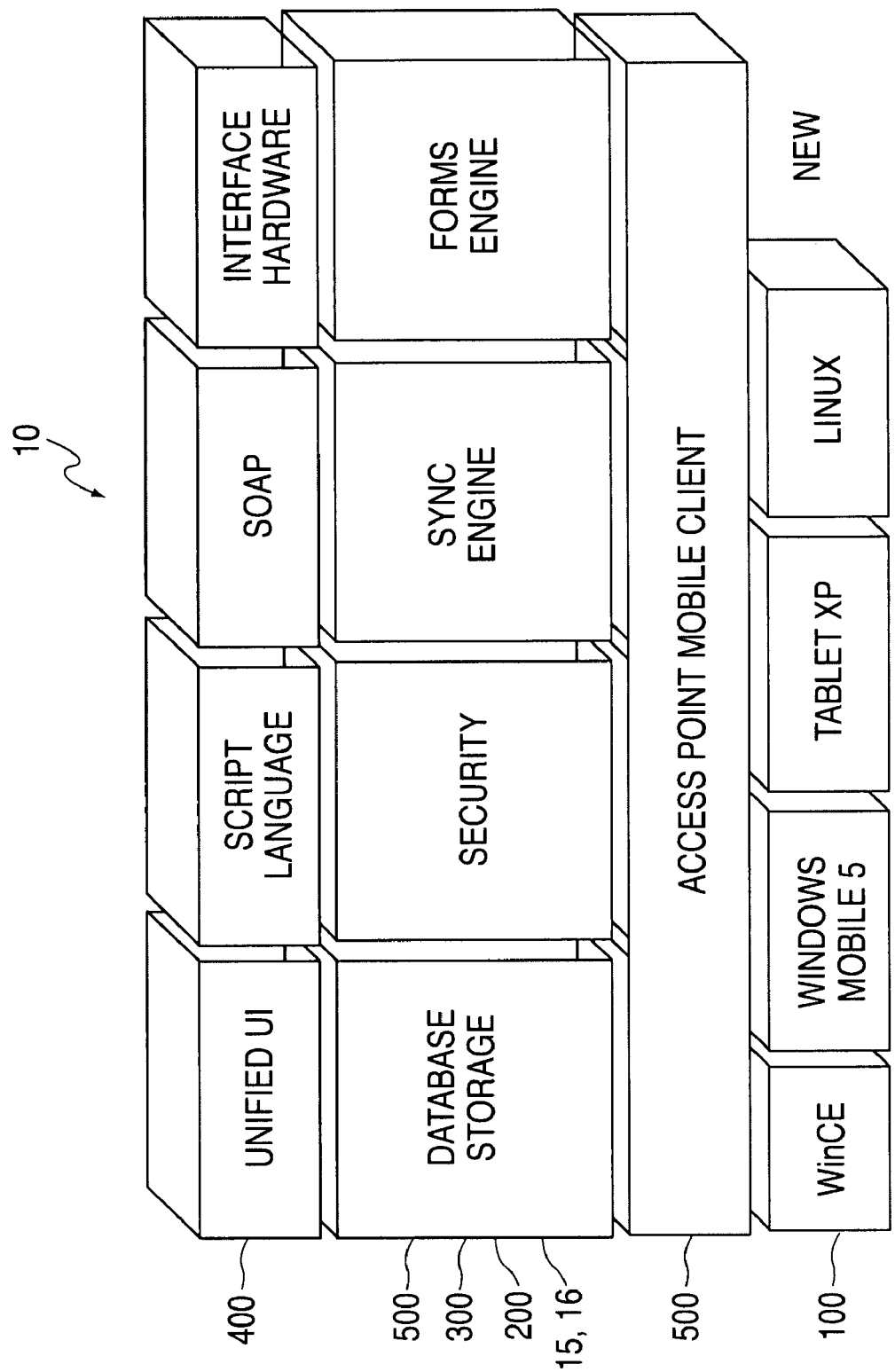
FIG. 3 is an illustration of a diagram of the technical software architecture of the synchronization server, integration server, mobile client and operating systems and elements of a mobile data collection and management system, according to an embodiment of the present invention.

Referring now to FIGS. 2 and 3, the physical hardware implementation and software requirements for the system 10 are shown, respectively, according to an embodiment of the present invention. Accordingly, regarding utilization of software, various parts of the platform of the present system 10, such as the Form Builder 100, Web Application 200, Synchronization Server 300, and the Integration Server 400 were developed using JAVA while the mobile client 500 was developed in C/C++.

A preferred embodiment of the Form Builder component 100 is run on a computer server having specifications of a CPU with a 1G+ speed, minimum RAM memory of 512 MB, hard disk drive space of 32 MB, and supports an operating system, such as Win 2000++ (excluding Win ME), or any operating system capable of running in a Java Runtime Environment (JRE) v1.4+. A preferred embodiment of the Mobile Client component 500 is supported on a Tablet XP or XP Professional (Windows 32 OS), Mobile Operating Systems (Win CE v4.1), Windows Mobile 5, and PocketPC 2002/2003. Additionally, the Mobile Client component can run communication components and supports peripheral and data collection devices via Bluetooth and WIFI. Preferably the development software tools used to create the dynamic applications and differing template forms, data collection surveys and applications can include: Borland JBuilder 2005, Sun Java SDK (v1.4), Visual Studio C++ (v7.1), and MS Embedded C++ (v3.0 or 4.0). Accordingly, the Mobile Device applications are configurable and allow for change/add business rules in real-time.

Preferred embodiments of the Web Application component 200, Synchronization Server component 300 and Integration Server component 400 are any J2EE Application Servers (e.g., WebSphere, Tomcat, JBOSS), run in a JRE v1.4+, and have SQL Server 2000 SP3 security protocols. The servers are preferably capable of at least 500 simultaneous connections at 8 MB per connection, have a bus speed of 1.5 GHZ, and 512K RAM memory. It should be noted that each server is scalable as each has the ability to operate on both distributed and non-distributed processing models. Thus the system can supports additional servers (e.g., servers 201, 202, 301, and 302) with numerous simultaneous users.

With regard to the databases 15 and 16 (et. al), preferably the present invention uses it's own optimized databases which are based on a "Network Database Architecture". This method offers fast search capabilities, multiple queries, and storage of complex parent/child relationships. Preferably utilizing a PPC (133 MHZ Processor) that can retrieve at least 263 records per second (300 byte) or 10,000 records in 38 seconds. In addition, some key attributes of this model of data storage are that it allows for modeling of many-to-many relationships of the data, supports a multi-parent concept, and is a network model that is based on mathematical set theory. It is to be understood, however, that alternative storage support may be utilized.

In terms of implementation data transmission over the transport layer, data transport is handled using XML/SOAP and a BXML format that is compressed and encrypted to increase performance and minimize bandwidth usage. With regard to the security of the data, all transmissions from the System's servers to the client devices or vice versa is done over HTTP/HTTPS using BXML which compresses and encrypts the data to transfer it quickly, safely and securely. Thus in transit the data is both secured via https and in a binary format (i.e. unreadable to the naked eye). Preferably the underlying data is also encrypted/decrypted via blowfish 128 bit block cipher encryption and the LZ77 Deflation compression algorithm. Thus even if broken the underlying data is in a format that would render it useless, thereby providing end-to-end security.

Figure 4:
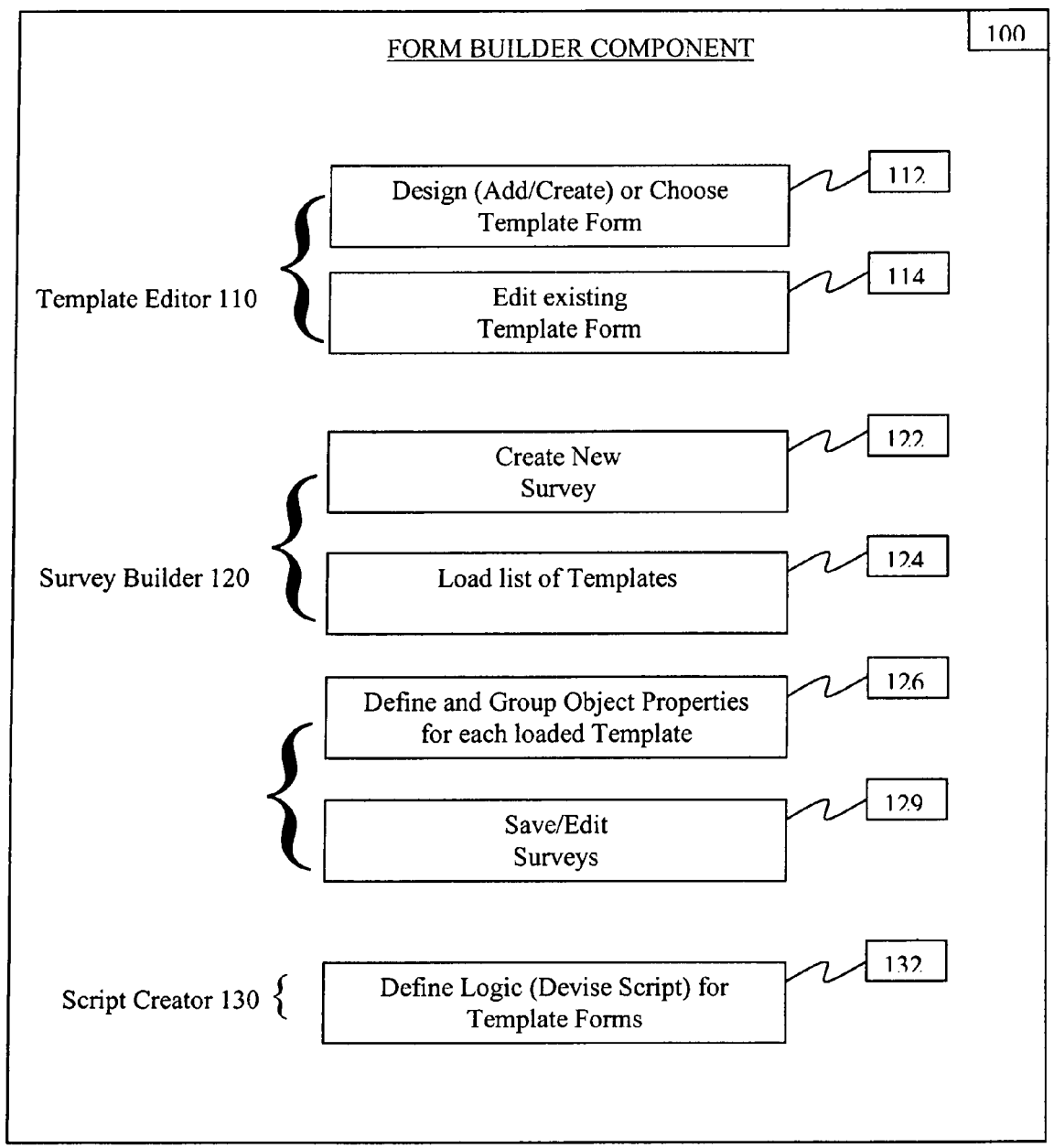
FIG. 4 is an illustration of a methodology by which forms, surveys and/or applications may be constructed within the "form builder" component of a mobile data collection and management system, according to an embodiment of the present invention.

Referring now to FIG. 4, the Form Builder component 100 is the tool that is used to create the template forms, data collection surveys and business rule applications that are run on the Mobile Client component 500 and subsequently managed through the Web Application component 200. The Form Builder is designed to be user-friendly and allows authorized users (e.g., IT or business users) the ability to design, develop, edit and deploy handheld forms, surveys and applications. In other words, the form builder's user interface and menu driven structure support the development and updating of forms/surveys/applications that utilize sophisticated scripting and business logic, by the business unit or internal IT resources. A key benefit of this design is the ability to self-maintain the system and deploy new forms and changes more rapidly without reliance on outside programmers. Another key benefit of this design is the ability to maintain processes defined by a business at the application level on the mobile client, thus eliminating the need for long training sessions and additional resources needed for references, and therefore improving the quality of the data pushed to the enterprise.

The Form Builder component 100 comprises three operative interface pieces, that is, the Template Editor 110, the Survey Builder 120, and the Script Creator 130. The vast majority of forms are thus created using these interface pieces. It is to be understood that each of the three operative interface pieces may be utilized together or separately, and indeed, in so being utilized separately are therefore to be considered as independent one from the other.

Figure 5:
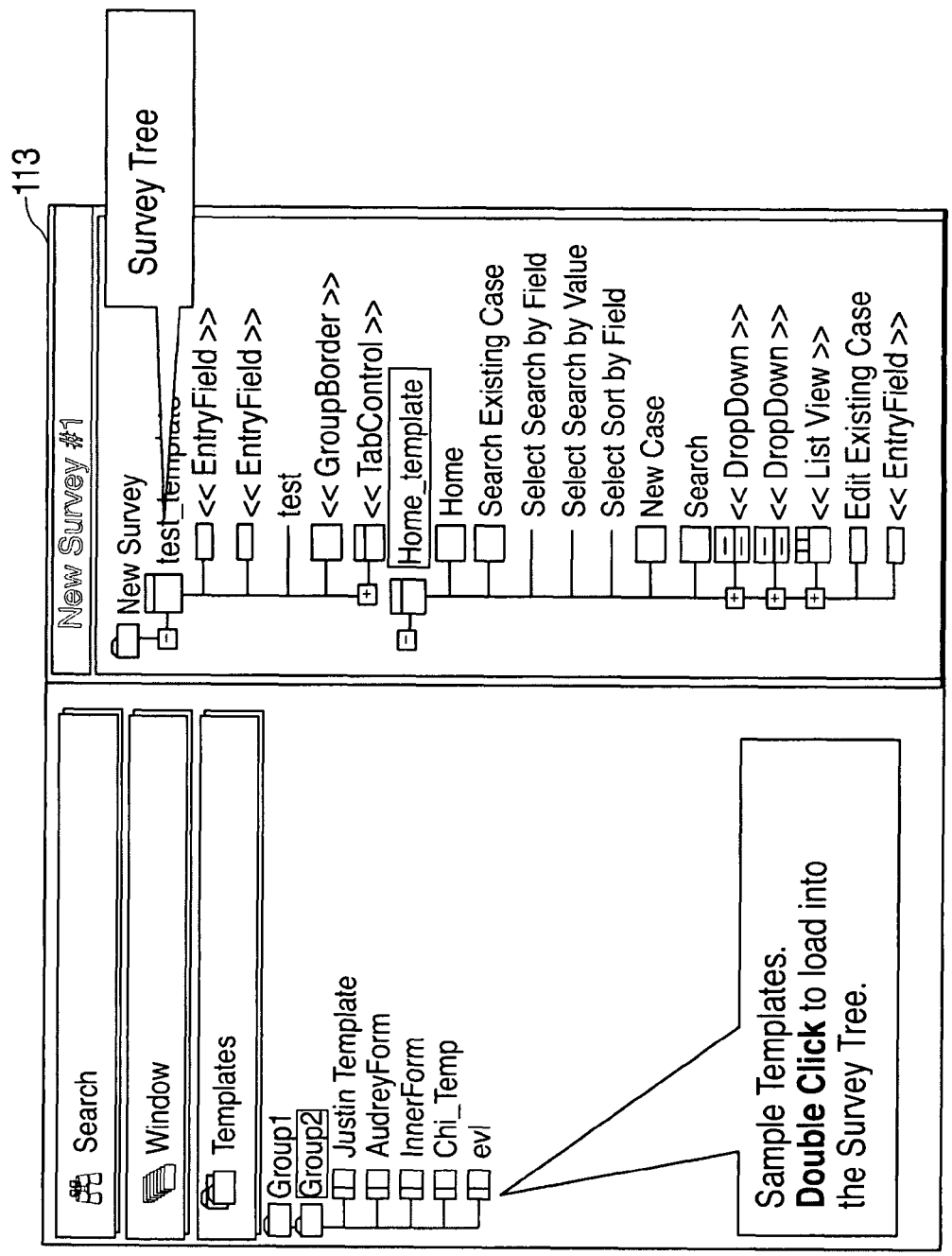
FIGS. 5 through 10 are illustrations of various data entry form "web shots" as utilized by the "form builder" component of a mobile data collection and management system, according to an embodiment of the present invention.

In steps 112 and 114, the first operative interface piece, the Template Editor 110, allows a system user to, respectively, design or choose a template form or edit an existing template form. The Template Editor is a full Graphic User Interface (GUI) development environment for editing/building forms. Referring now to FIG. 5, a screen shot 113 is shown by which the system user can choose a template form. The system user selects the "Templates" tab to expand and present a list of template forms that are already populating the Template Editor 110. As is shown, the list may be categorized into groups. The template forms may be loaded in to the survey creation tree by double clicking.

Figure 6:
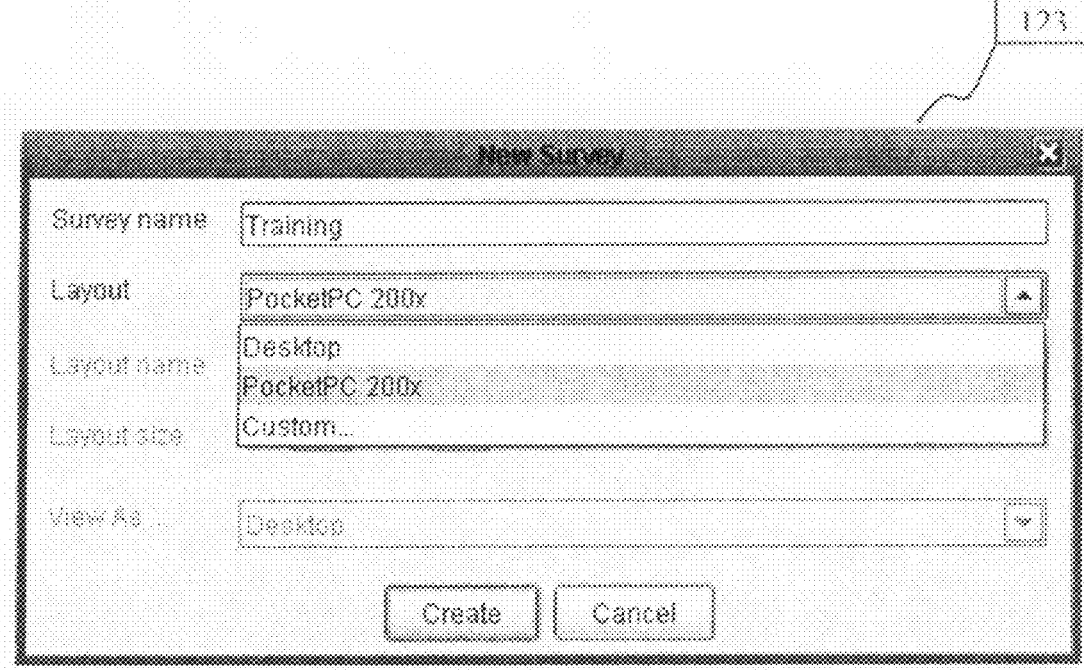

As is shown back in FIG. 4, the second operative interface piece, the Survey Builder 120, allows a system user, in step 122, to create a new survey. Referring now to FIG. 6, an example of a new survey creation screen shot 123 is shown. In this example the system user fills in a name for the respective survey they wish to create. Here the input "Training" is entered the "survey name" field. The system user then has an option to select one of the following from the dropdown menu: "Desktop", "Pocket PC 200x", "Custom Layout". These are examples of the possible mobile applications to which the survey will be sent. In this example, both the "Desktop" and "Pocket PC 200x" have default dimensions. The remaining fields: "Layout name", "Layout size", and "View As" are only required for custom layouts. Here the system user chose "Pocket PC 200x". To complete the creation of the new survey the system user selects the "Create" pushbutton to return to the design area.

Figure 6A:
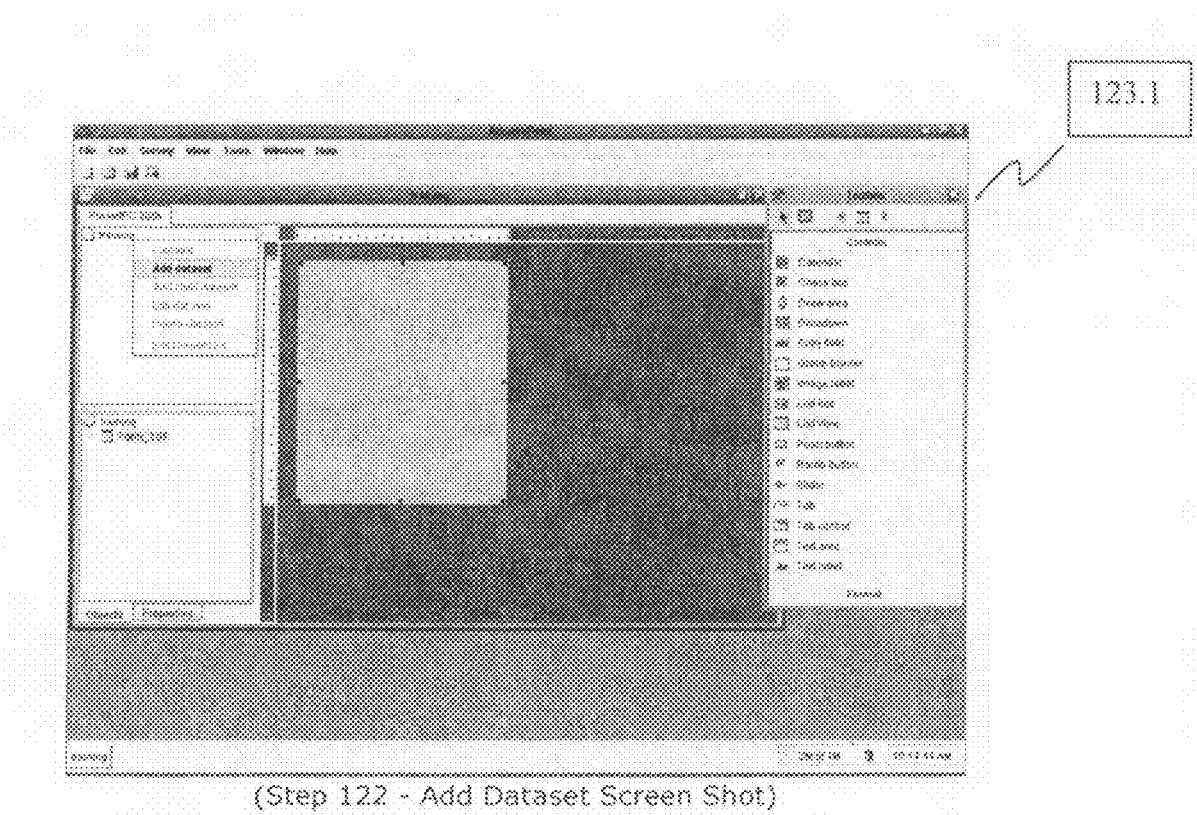

Alternatively to, or in conjunction with, loading a template form, a system user may load a dataset. A dataset is a list of questions that the system user can use in order to create a new survey. As shown in FIG. 6A, an "Add Dataset" screen shot 123.1 is shown. On the left hand side of the screen shot appears two panes. The top left hand pane is called the Dataset Tree, while the bottom left hand pane is called the Forms Tree. The "Dataset Tree" represents all dataset questions along with their respective controls in a tree branch format. The "Forms Tree" represents all template forms along with their respective questions and controls in a tree branch format. To add a dataset, the system user right clicks the survey "Training" in the "Dataset Tree" pane and selects "Add dataset" from the dropdown. As shown, a "DataSet" popup window will appear.

Figure 6B:
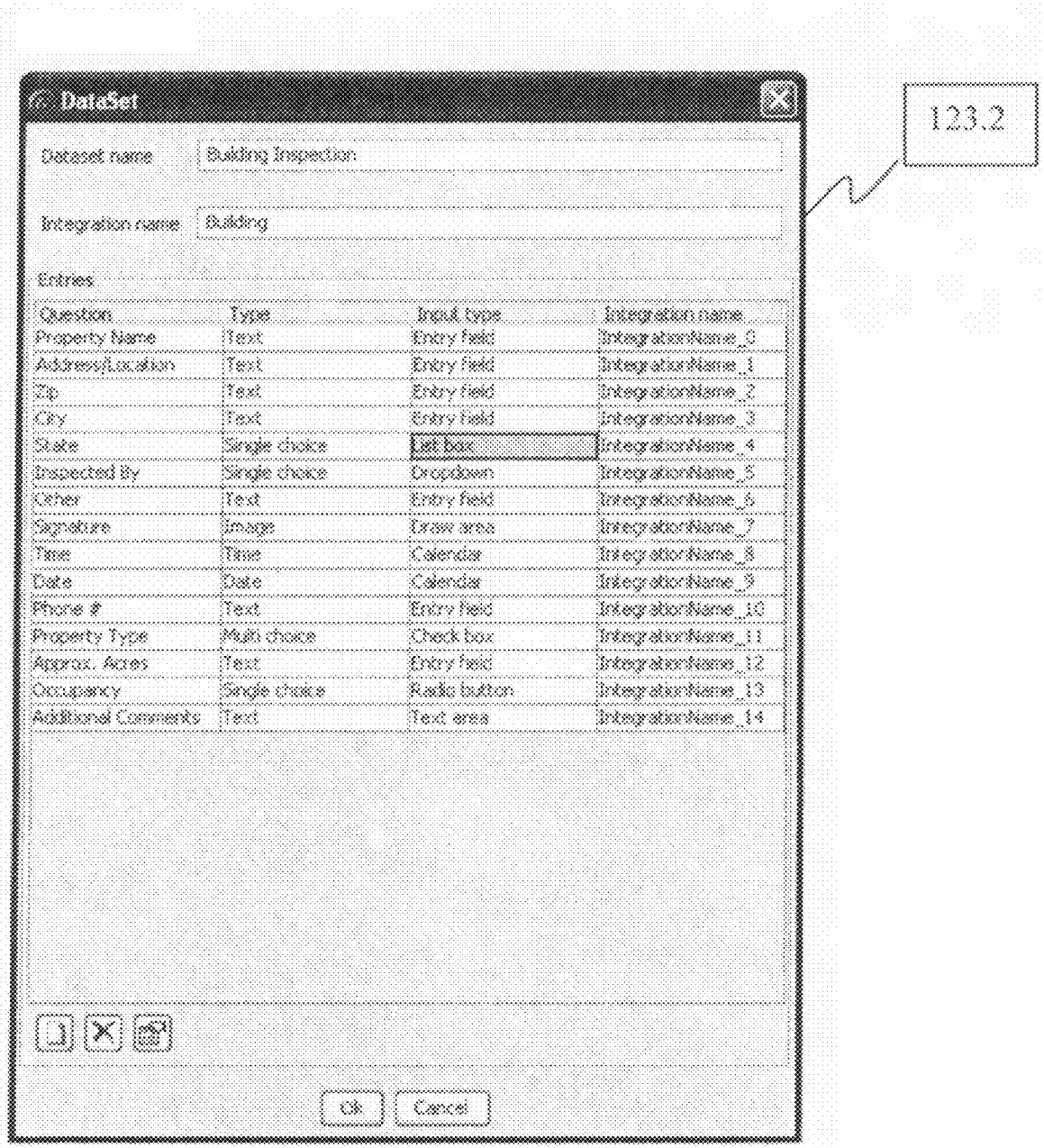

When a system user desires to create a survey utilizing a dataset there are attributes that need to be provided. For instance, referring now to FIG. 6B, examples of these attributes are shown in screen shot 123.2 "Dataset Questions". These include: Text of the Question; Question Type Choice (e.g., question can be: multi-choice, single-choice, text, boolean, date, time, whole number, decimal number and image); Input Type (refers to the presentation of the question and answer block, i.e. dropdown, radio button, check box, list box, entry field, calendar, draw area and slider); and Integration Name (used to identify the integration and automatically populated with a sequential pattern).

Dataset questions in the "Data Tree" that are bold represent questions with predetermined answer choices. A child dataset may be required depending on the structure and nature of the survey being created. The parent dataset is one level higher and directly associated with one or more children. A child dataset is on the dependent side of a hierarchical relationship where the parent would be on the controlling side. The child dataset is one level lower and must have one parent. Creating a child dataset requires the same process as creating a parent dataset.

Figure 6C:
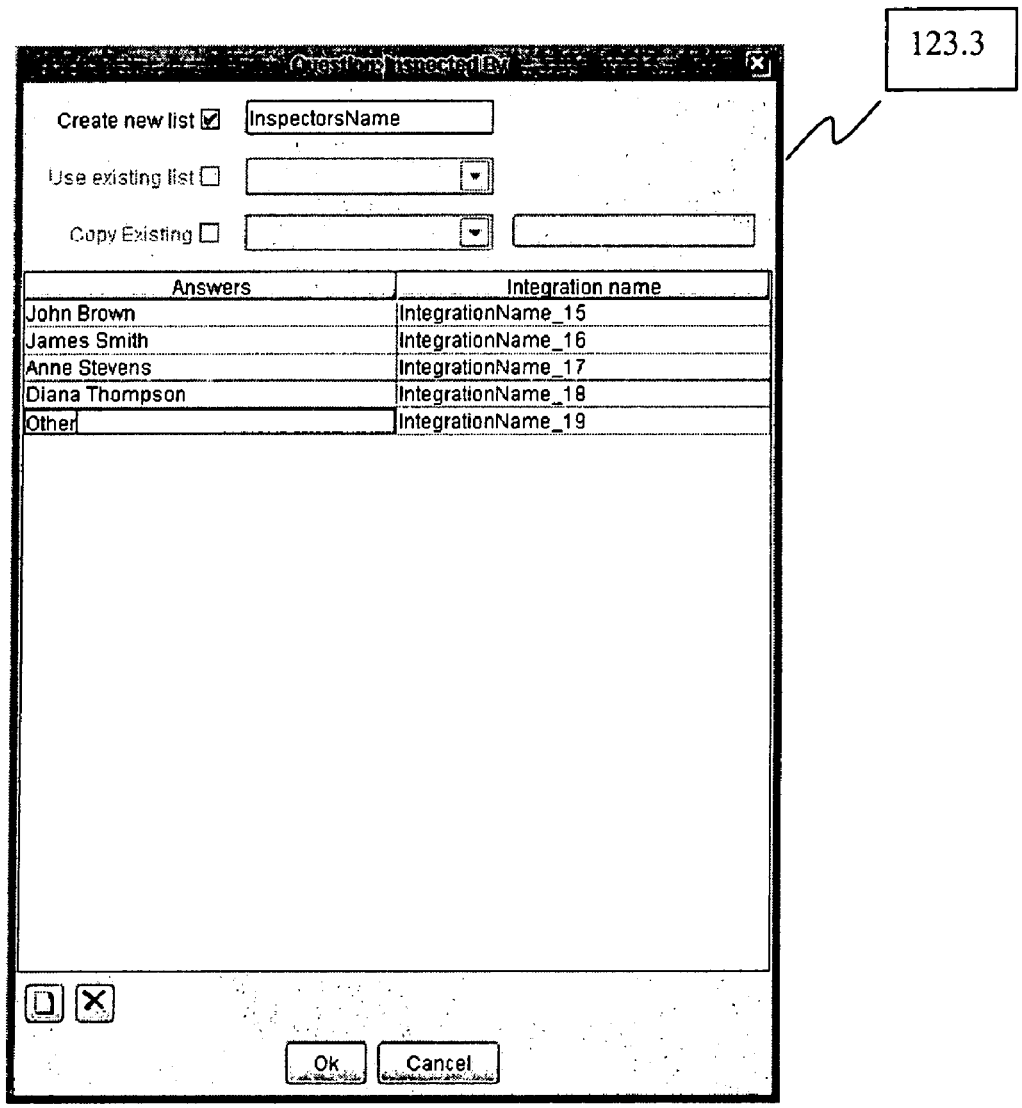
Figure 7:
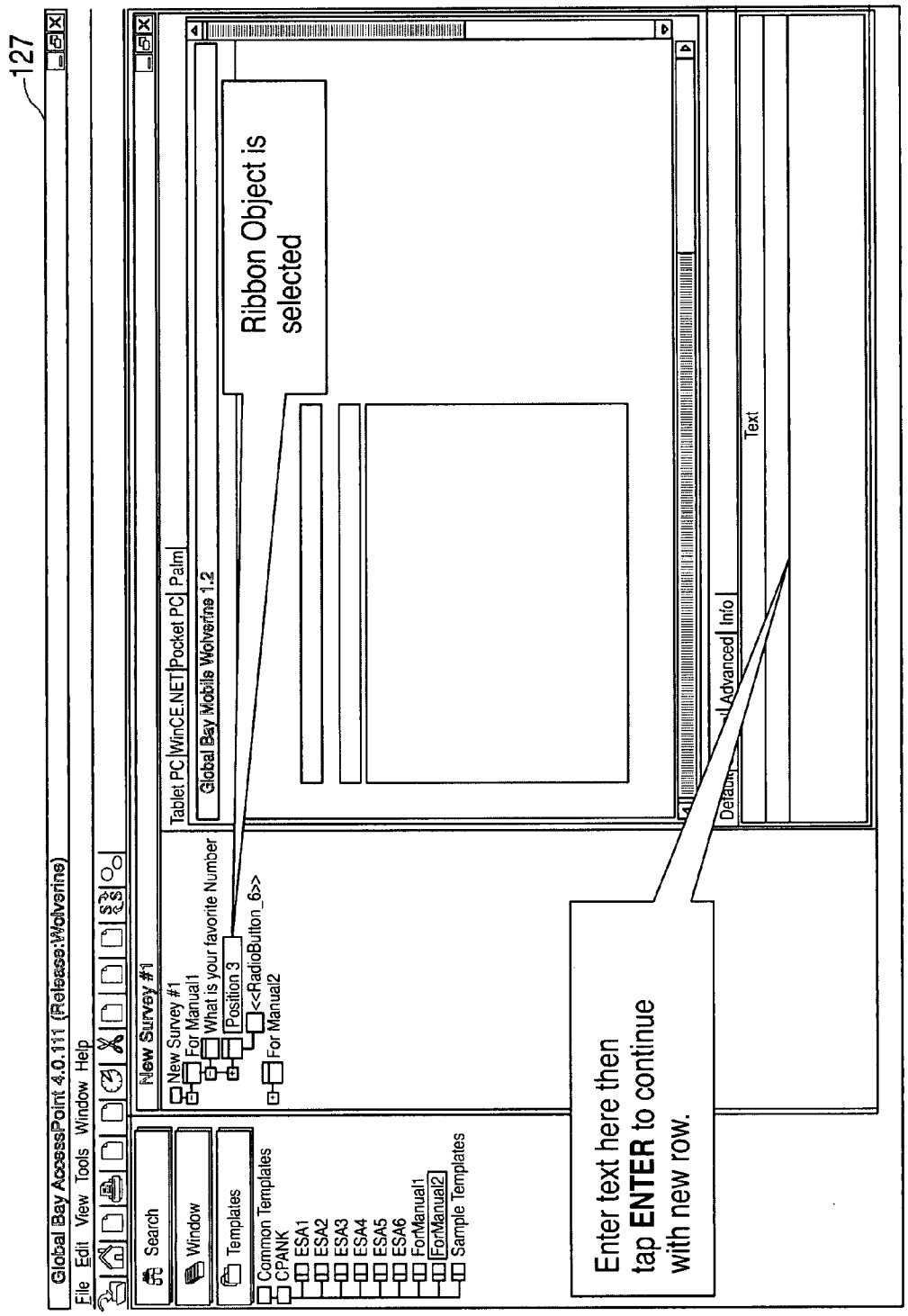

Referring now to FIG. 6C, the system user is able to create dataset answers for each of the new dataset questions. As shown in the dataset answers screen shot 123.3, to do so the system user provides the following: the Text of the Answer; and an Integration Name. In addition, as is also shown in the screen shot, when the system user creates the answer lists for the new questions the system user also has the ability to reuse existing answer lists that were previously created by selecting either the option to "use existing list" or to make a copy of an existing list by selecting the option to "copy existing".

Referring back now to FIG. 4, if the system user so desires, in step 124 in conjunction with the above or again yet alternatively the system user may load a list of stored templates for use in the newly created survey. Utilizing each of these interface pieces, questions and data inputs for the field users are created (all from drop down GUI interfaces) for the forms. Accordingly, as has been show, questions can be made mandatory and answer choices can be pre-populated to minimize user error.

Figure 8:
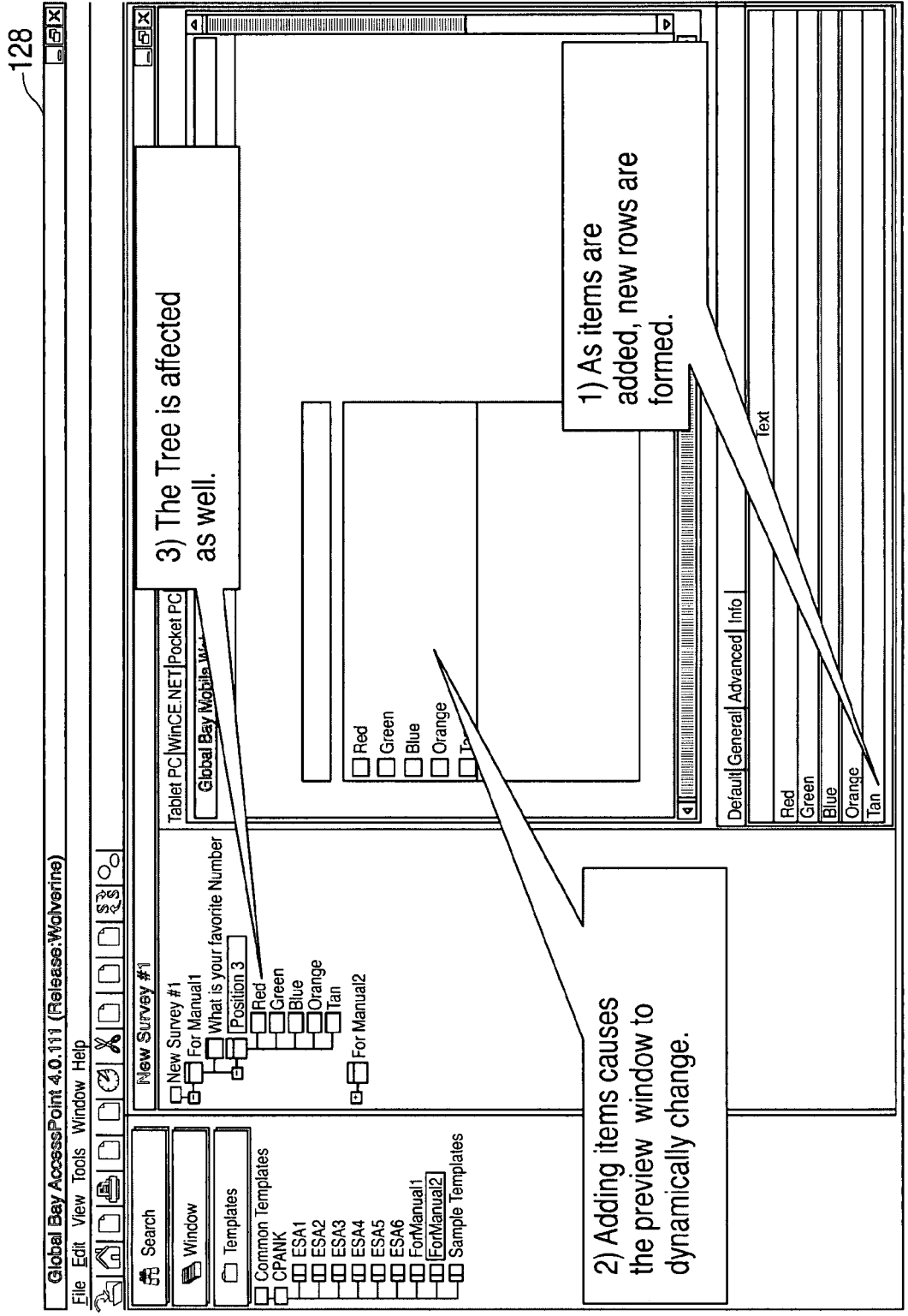
Figure 8A:
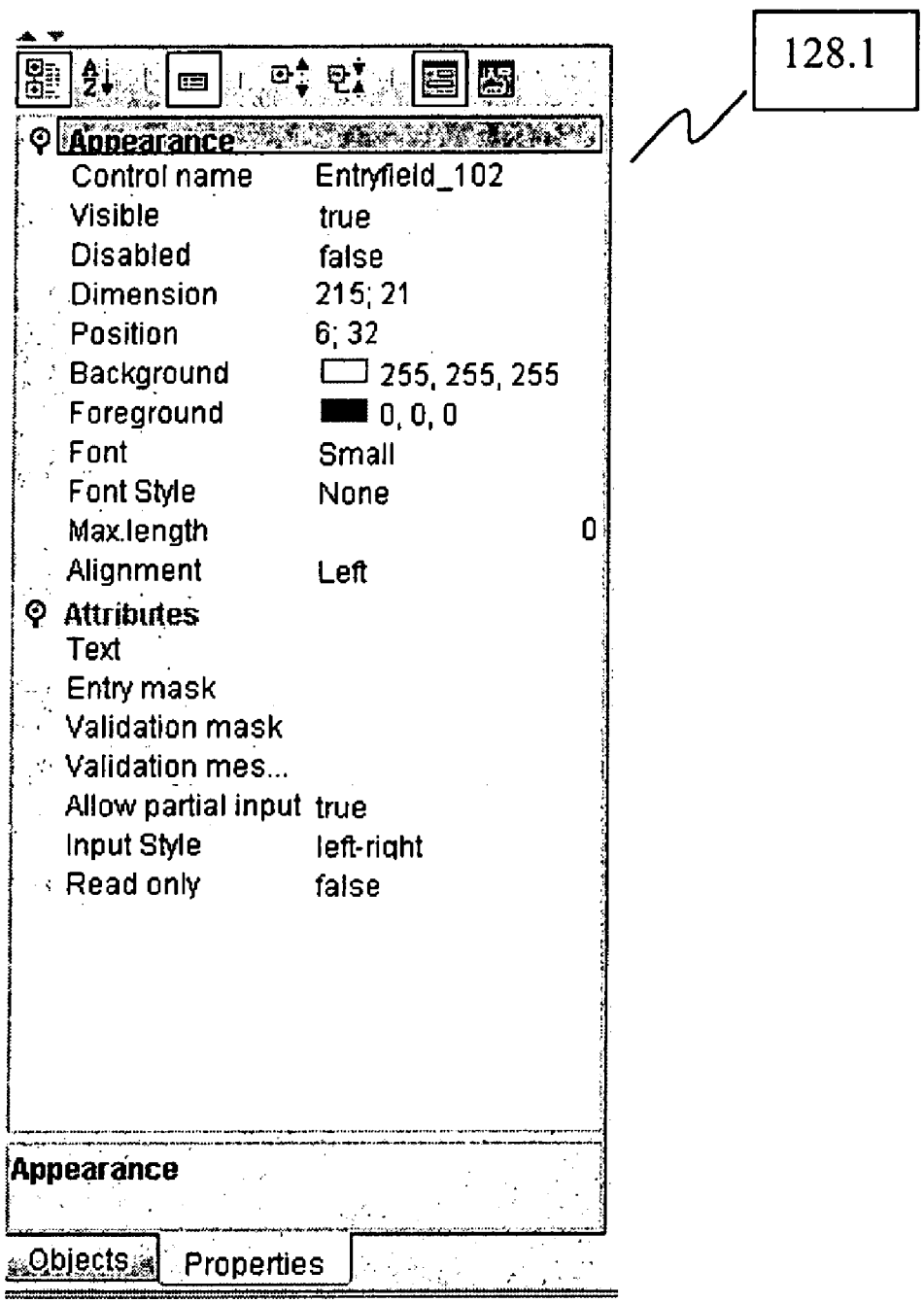

The Survey Builder 120 further allows a system user, in step 126, to define and group object properties for each loaded survey and/or template form. Thus, specific properties and validations for the surveys/forms can be set. For instance, referring to FIGS. 7 and 8, screen shots 127 and 128, respectively, show the setting of properties in a template form. Also for instance, referring to FIG. 8A, screen shot 128.1 shows the setting of properties in a survey. Here "Appearance" and "Attributes" window panes allow a system user to specify preferences for selected controls. In sum these allow for the ability to set input and validation masks to allow for complex, custom as well as standard, data entry types (i.e., SSN, phone #, zip code, etc.). In addition, incorrect data entry error messages can be defined, font sizes and colors can be determined, graphics can be inserted, screen objects aligned, etc. For ease of use the screen designer is a drag and drop interface. Also in addition, the present invention supports various question types and "look and feel" controls (such as scroll bars and tab driven interfaces), as well as user friendly form and data element selection features (such as drop down lists, radio buttons, check boxes, text area for open ended questions), graphical drawings, signature captures, and numeric entry.

The Survey Builder 120 also further allows the system user, in step 129, to save and, if so desired, further edit the form. Selecting to save the form would save the application in a bxml format within the database on the server (as further described below). A form preview screen then allows the system user to preview what the form(s) will look like on mobile devices before it is provisioned to the field. This has the practical effect of enabling better QA testing and design of the forms.

Figure 9:
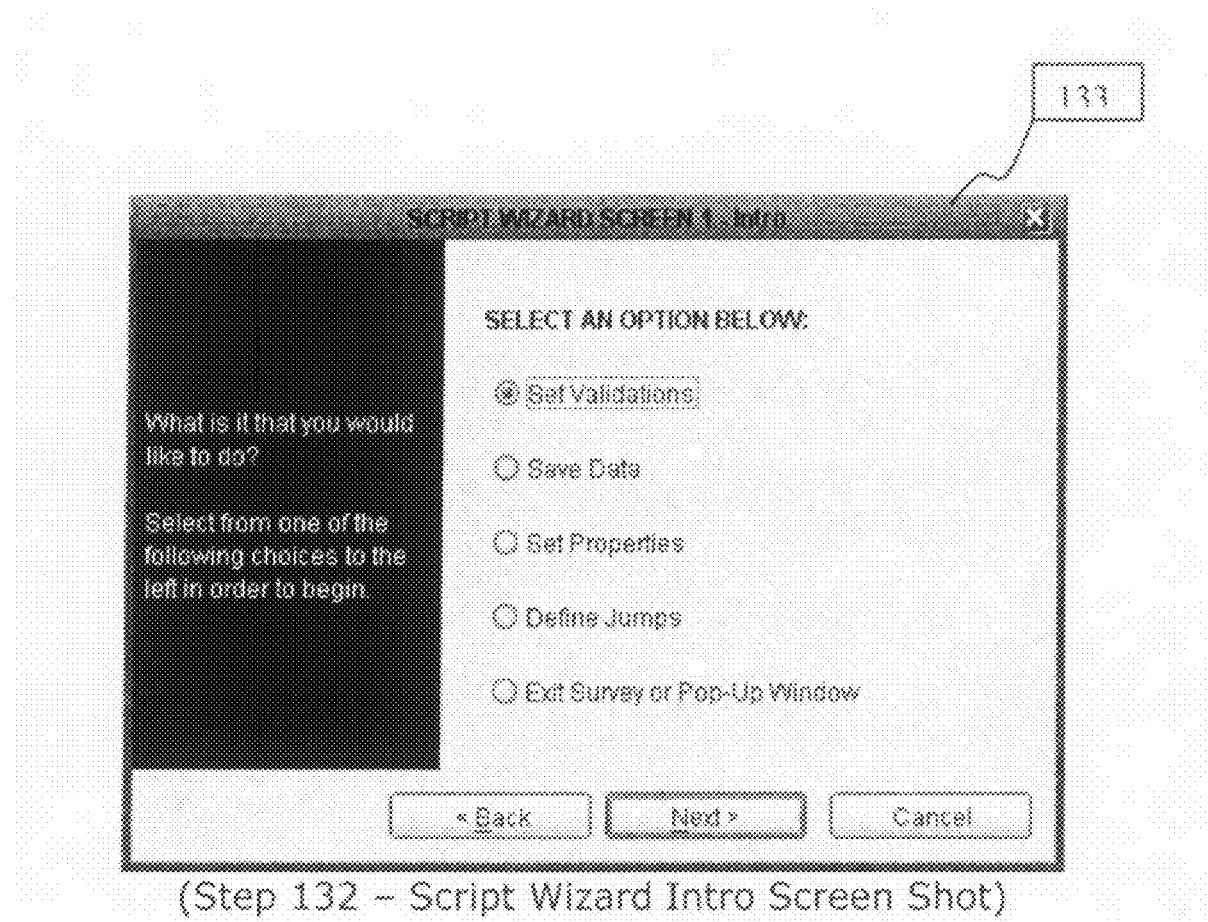
Figure 10:
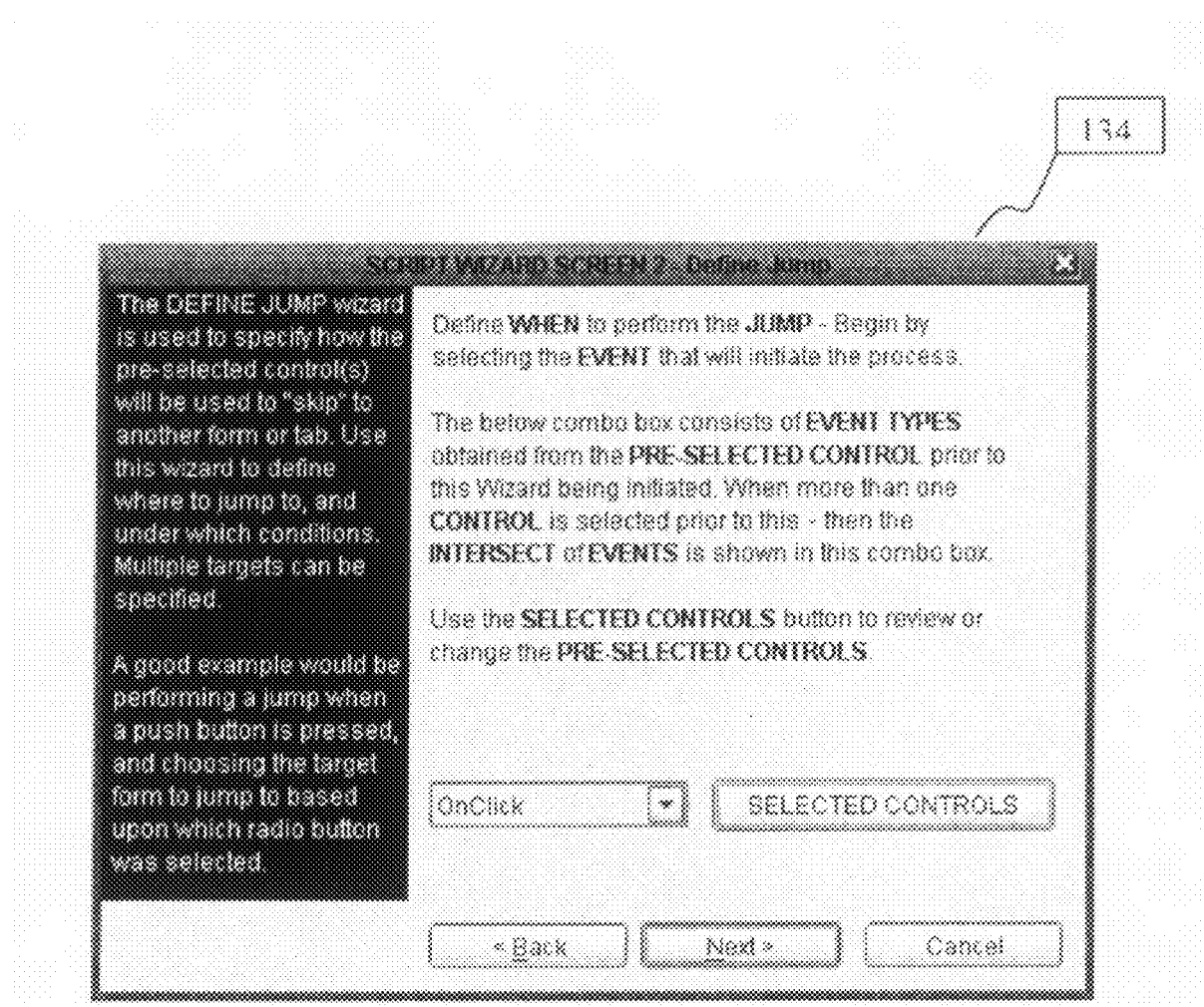

The third operative interface piece of the Form Builder component 100, the Script Creator 130, allows the system user to manually script advanced logic into the form if the need arises. The Script Creator 130 is a script wizard for implementing sophisticated logic (e.g., scoring logic, field verification, etc.) allowing for significant functionality and flexibility to be generated automatically. As is shown in FIG. 9, a screen shot 133 of an introductory page to the script wizard gives the system user multiple choices/options. Thus, referring back to FIG. 4, in step 132 the system user can operatively define logic (i.e., devise script) for the template forms or data collection surveys. The wizard operates by system user input and decision making along a series of steps via GUI based functionality. Such allows for a non technical user to create complex logic, manipulate control properties (i.e. font, color, size, etc.), set validations, filter lists, define jumps, define data save points, populate controls with value, etc., without ever having to write a single line of code. For instance, referring now to FIG. 10, if the "Define Jumps" option is selected on the Intro page 133, the script wizard will lead the system user through a defining of the jump as is shown by screen shot 134. For the more technical user scripting can also be implemented directly. Accordingly, Script Creator 130 allows for complete customization of forms and much more advanced logic.

Together the three operative interface pieces of the Form Builder component 100 allow the system user to develop and deploy much more than a simple template or data collection survey, and instead, system users can create comprehensive applications based on complex business processes.

Figure 11:
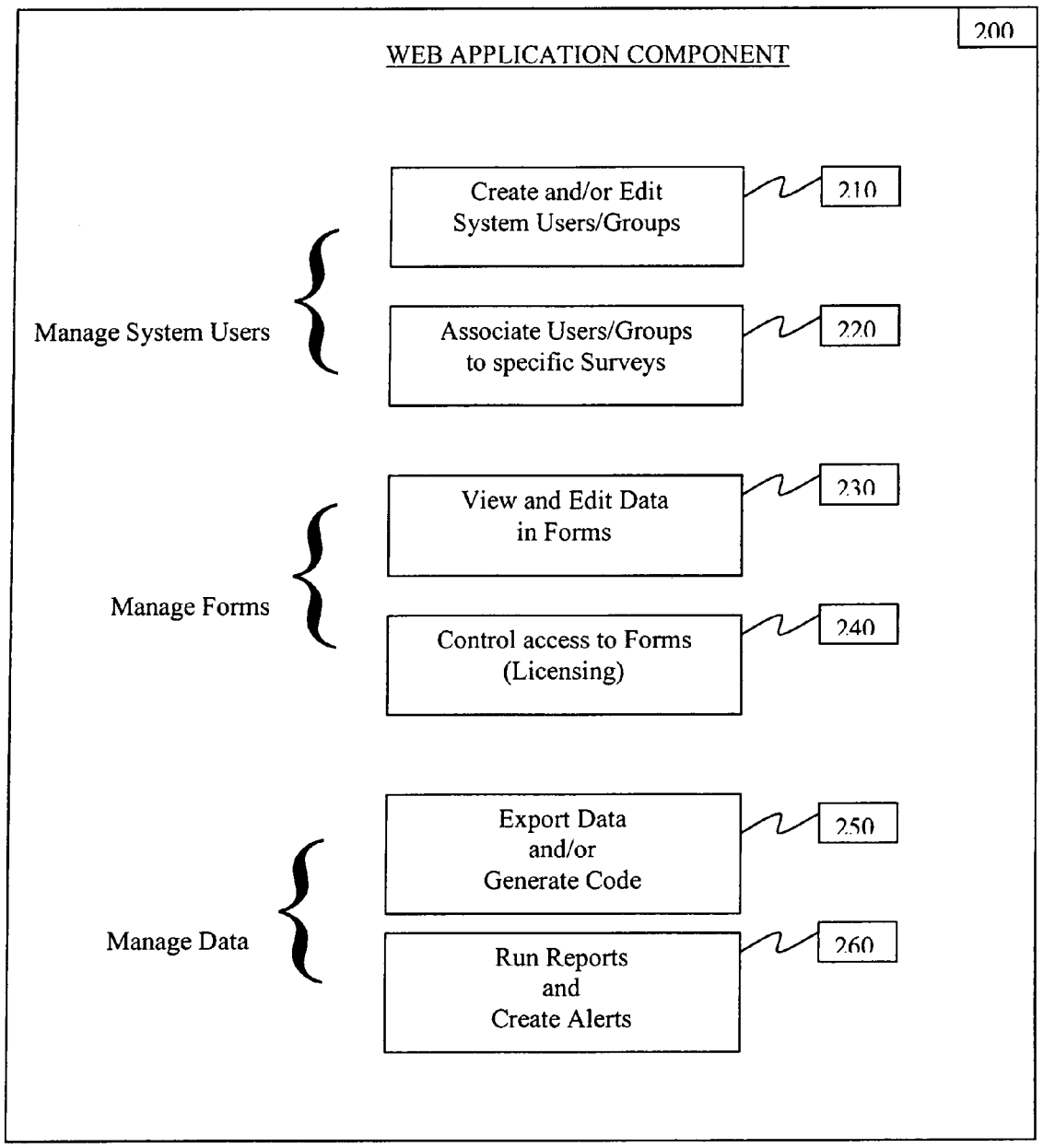
FIG. 11 is an illustration of a methodology by which management of the created, distributed and collected forms, surveys and/or applications can be accomplished via electronic means with the "web application" component of a mobile data collection and management system, according to an embodiment of the present invention.

Referring now to FIG. 11, the Web Application component 200 is the computer software application that allows system users to access the System 10. The Web Application runs on any J2EE compliant application server such as, for example, Apache Tomcat. This enables the present invention Web Application to be platform-independent.

As is shown in the Figure, the present invention's Web Application component grants administrators three separate management abilities, that is, allowing administrators to manage the system users, manage the forms, surveys and applications in the systems database, and manage the collected data. As is detailed in the following paragraphs, this allows for form/survey/application creation and design management, distribution management, and management reporting through an intuitive and easy-to-use web interface.

Figure 12:
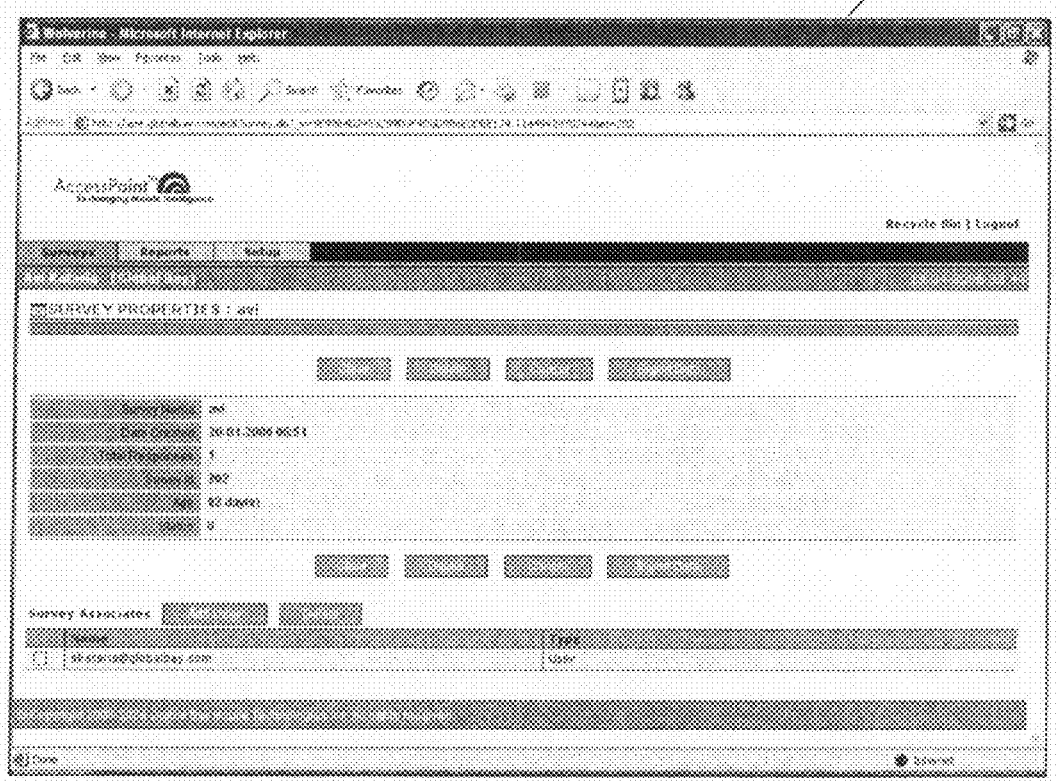
FIGS. 12 through 16 are illustrations of various data entry form "web shots" as utilized by the "web application" component of a mobile data collection and management system, according to an embodiment of the present invention.
Figure 13:
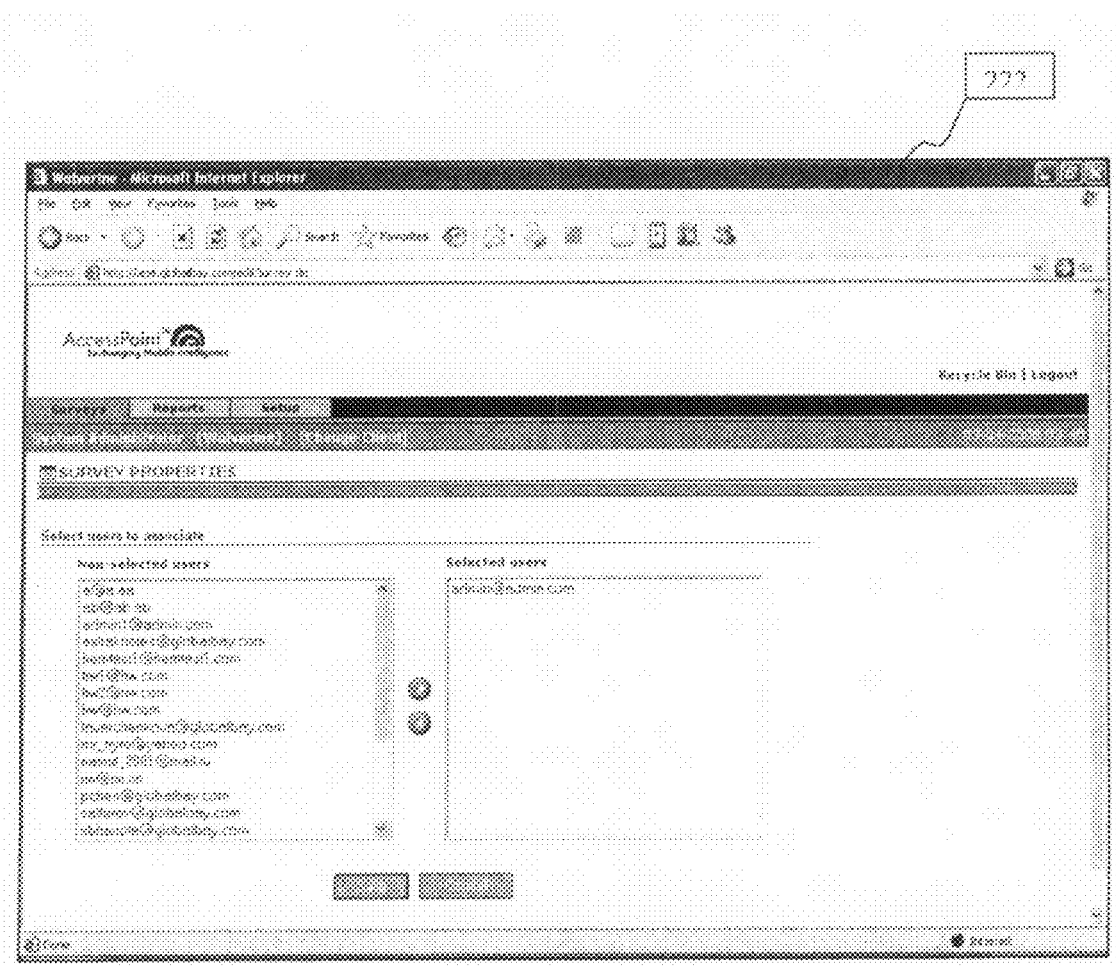

In allowing management of system users, in step 210, a system administrator can create and/or edit system users and/or groups, and in step 220, a system administrator can associate users and/or groups to specific forms, surveys or applications. Referring now to FIGS. 12 and 13, examples of two screen shots showing the selection process to associate a user to a specific survey are shown. In FIG. 12, a screen page 221 shows that a specific survey "ari" has been chosen. To associate a field user to this particular survey, the system administrator clicks on the "add user" button. As is shown in FIG. 13, a screen page 222 titled "Survey Properties" with "Selected users to associate" appears. The system administrator selects the users under the "Non-Selected Users" column and use RIGHT arrow button to place them under the "Selected Users" column. Likewise, the system administrator can deselect users from the "Selected Users" column to the "Non Selected Users" column by using LEFT arrow button. Additionally, multiple selections of users can be done using the Control (Ctrl) key on the keyboard. In this manner then, the system administrator can control access to the System 10 by multiple means.

Figure 14:
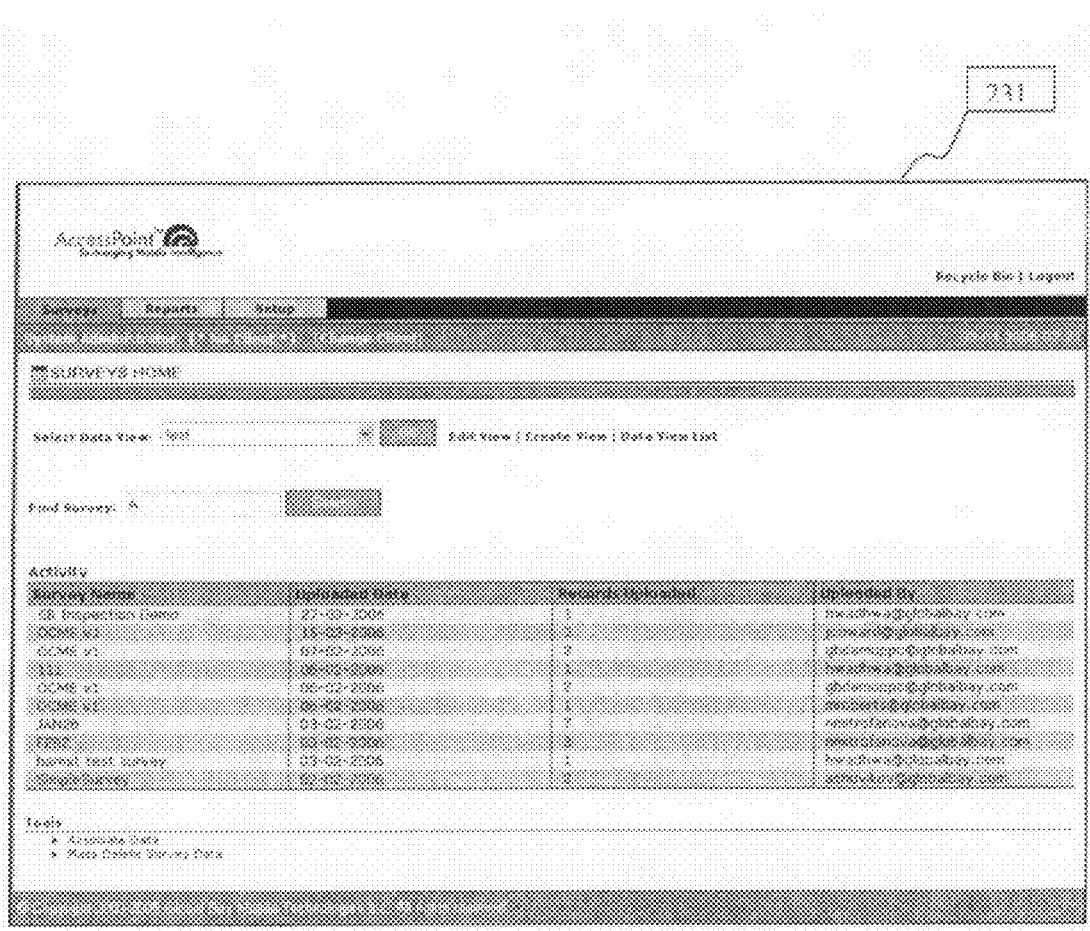
Figure 15:
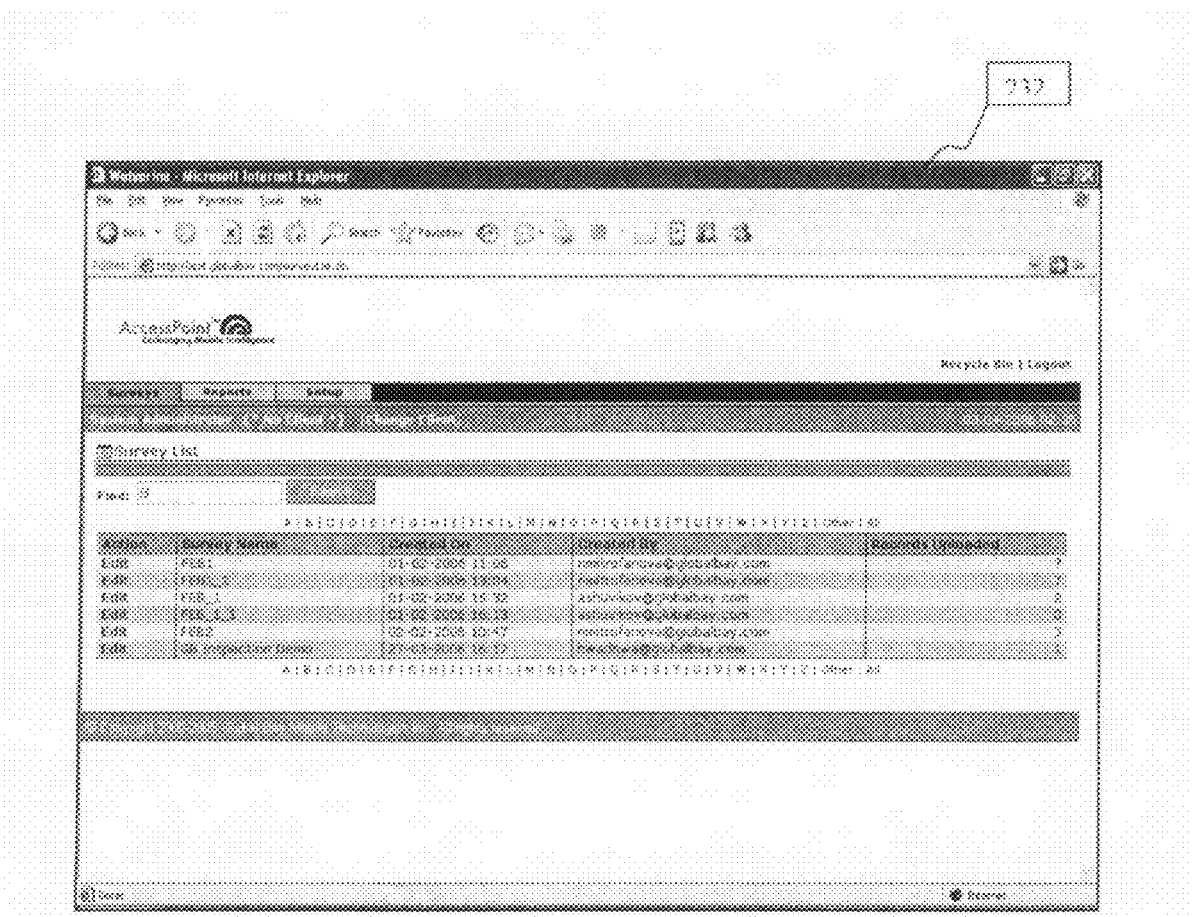

Referring back now to FIG. 11, in allowing management of the forms/surveys/applications in the systems database, in step 230, the system administrator can view and selectively edit data fields in the forms, and in step 240, can control who is able to access the forms. Referring now to FIGS. 14 and 15, examples of two screen shots show a search process that an administrator can use to select a specific survey to view and selectively edit the data fields therein. As is shown by screen shot 231 in FIG. 14, to run the survey search the system administrator would click the "Surveys Tab", which action would result in the page shown and titled "Surveys Home". The system administrator would then enter the survey's name or starting initials of the survey's name in the textbox labeled "Find Survey" and click the "Search" button. As is shown by screen shot 232 in FIG. 15, a page titled "Survey List"

appears. The system administrator can then choose the appropriate survey to view and edit. In this manner then, the system administrator can retain control over what data needs to be entered by the field users, control internal access, and implement, if so desired, a licensing program to control external access.

Figure 16:
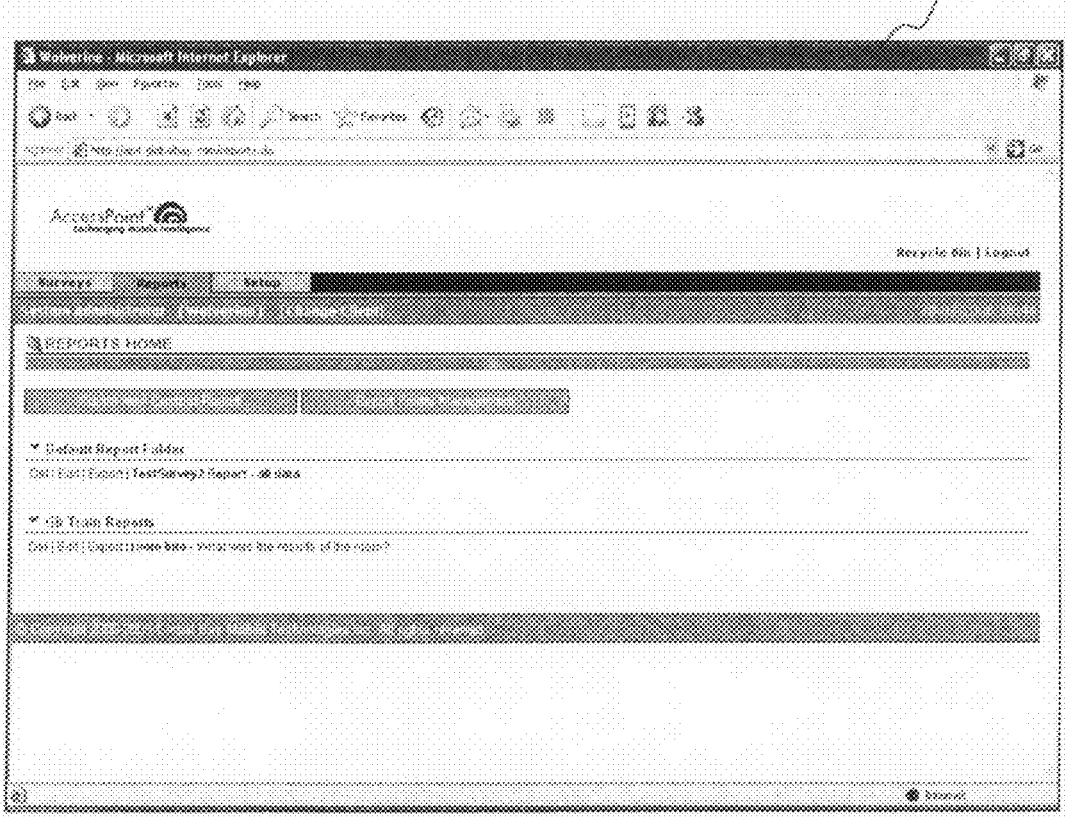

Referring back again now to FIG. 11, in allowing management of the data, in step 250, data can be exported, for instance into MS Excel, and in step 260, reports and/or queries can be run against the data that has so far been collected in the field. There are three types of reports that a system administrator can run, that is, Tabular, Linear and Summary Reports. The Tabular Report allows the system administrator to select fields (questions) from the survey that is chosen and then display the data collected in a tabular (line list) format. The Linear Report shows data as a set of elementary (linear) records, which can be sorted by any field. The Summary Report details are displayed in a summarized format allowing the system administrator to group the data by certain fields. Referring now to FIG. 16, in order to export the data, the system administrator first clicks the "Reports Tab". This action results in the screen shot 251 in which the system administrator can select a desired report to export and then click on the "Export" option to export the report. A file download dialog box will appear (not shown) that will allow the system administrator to either open a file or save the file into a specified data storage location. Either way, the chosen report is displayed in the form of an Excel spreadsheet. In this manner then, the system administrator can effectively manage the data collected.

Thus, as can be seen, the Web Application component 200 allows system end-users to access their data, create queries, develop and design reports and export data without intervention by IT staff. Access to these functions can be limited based on user rights and is managed within the Web Application.

Figure 17:
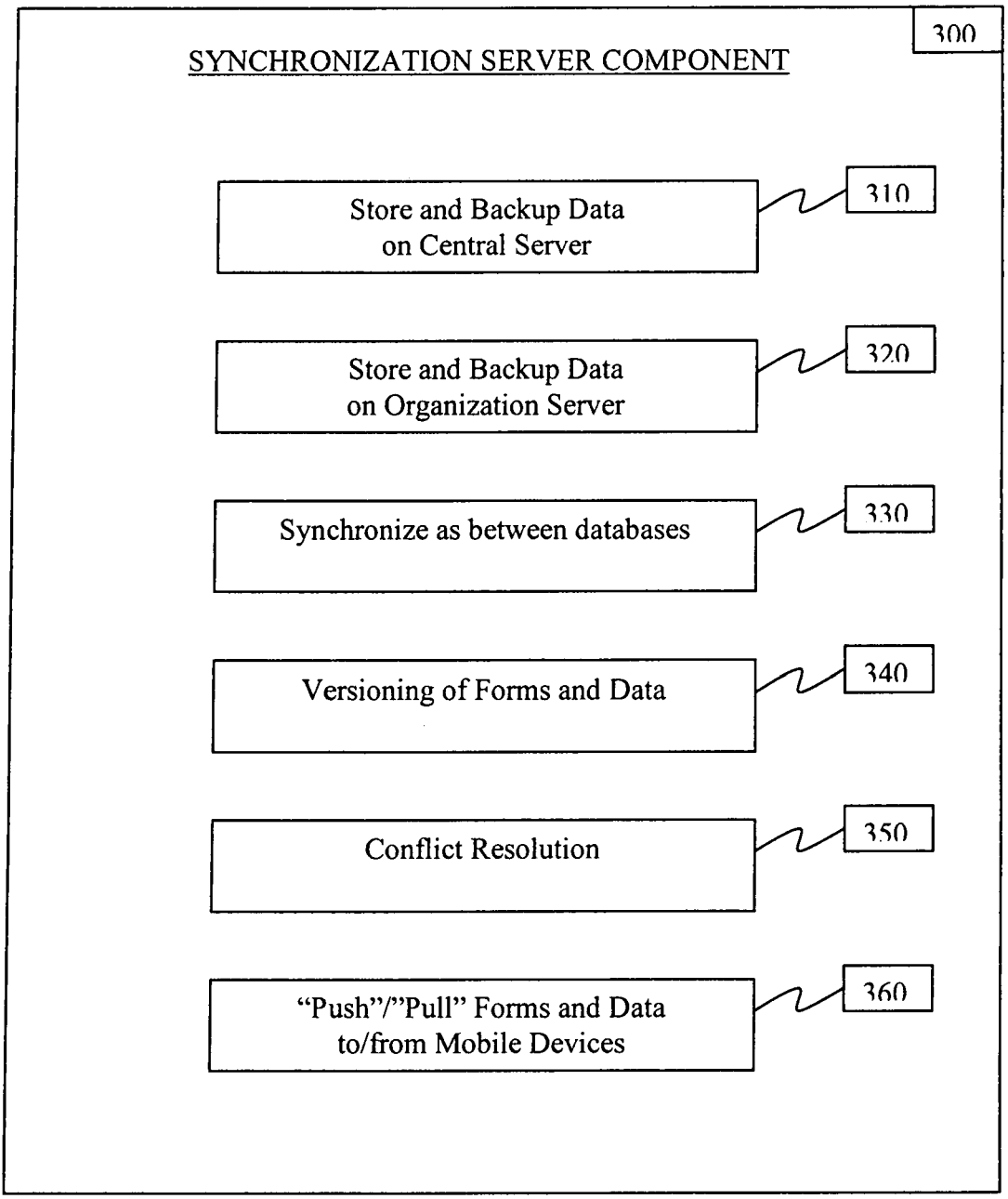
FIG. 17 is an illustration of a methodology by which data transmission, data collection conflict resolution, form, survey and/or application versioning, and storage of the collected data occurs as performed by the "synchronization server" component of a mobile data collection and management system, according to an embodiment of the present invention.

Referring now to FIG. 17, the Synchronization Server component 300 is the computer hardware/software that allows for control of the secure and efficient transmission and storage of data, forms and surveys as between the various other components of the mobile data collection and management system 10. The Synchronization Server component 300 also, as a primary feature, allows synchronization between the mobile devices of the Mobile Client component 500 and the architecture's database 15, and re-transmission support such that if data was not synchronized the transmission is not lost and but is sent on next synchronization. The Synchronization Server component can be managed through a management console application which offers full management and configuration of the server.

The first feature of the Synchronization Server component 300 is, in steps 310 and 320 respectively, the control of storing and backing-up data on a central server database 20 and on a organization's server database 21. As an additional feature, in step 330, the Synchronization Server component 300 will synchronize the data, forms and surveys stored as between the various databases.

Additionally, in step 340, data versioning of forms and data collected from the mobile devices is accomplished and controlled by the Synchronization Server component 300. Each time data is entered and each time a form is saved, new versions are saved. This is accomplished by storing such versions of the form and data therein entered under different version numbers. Thus during the life cycle of form modifications and data entry, the initial data model that was created is kept intact. If, for example, a particular question is removed from the form/survey, the question is removed from the form/survey, but not from the data model (i.e., the original or latest version). In this way then, a system user may still access data that is no longer being reported on in the field by the mobile devices.

In response to the ability to version forms and collected data, the Synchronization Server component 300 also, in step 350, conducts conflict resolution. The need for conflict resolution can occur if and when data collected from the field is incongruous for or outside the scope of the intended form/survey, or such data collected as between mobile clients is inconsistent or out-of-date.

As mentioned above, a primary feature as shown in step 360 is the synchronization of data, forms and surveys, business rules and validation to and from the mobile devices of the Mobile Client component 500. Such synchronization is 2-way synchronization, that is, data is pulled from the device and data is pushed to the device. In other words, data not only goes from device to server but vice versa as well. In addition updates of the forms and/or surveys are pushed to the mobile device. Such updating can be system wide or selective in that data can be "pushed" to a mobile device on a user specific basis.

Figure 18:
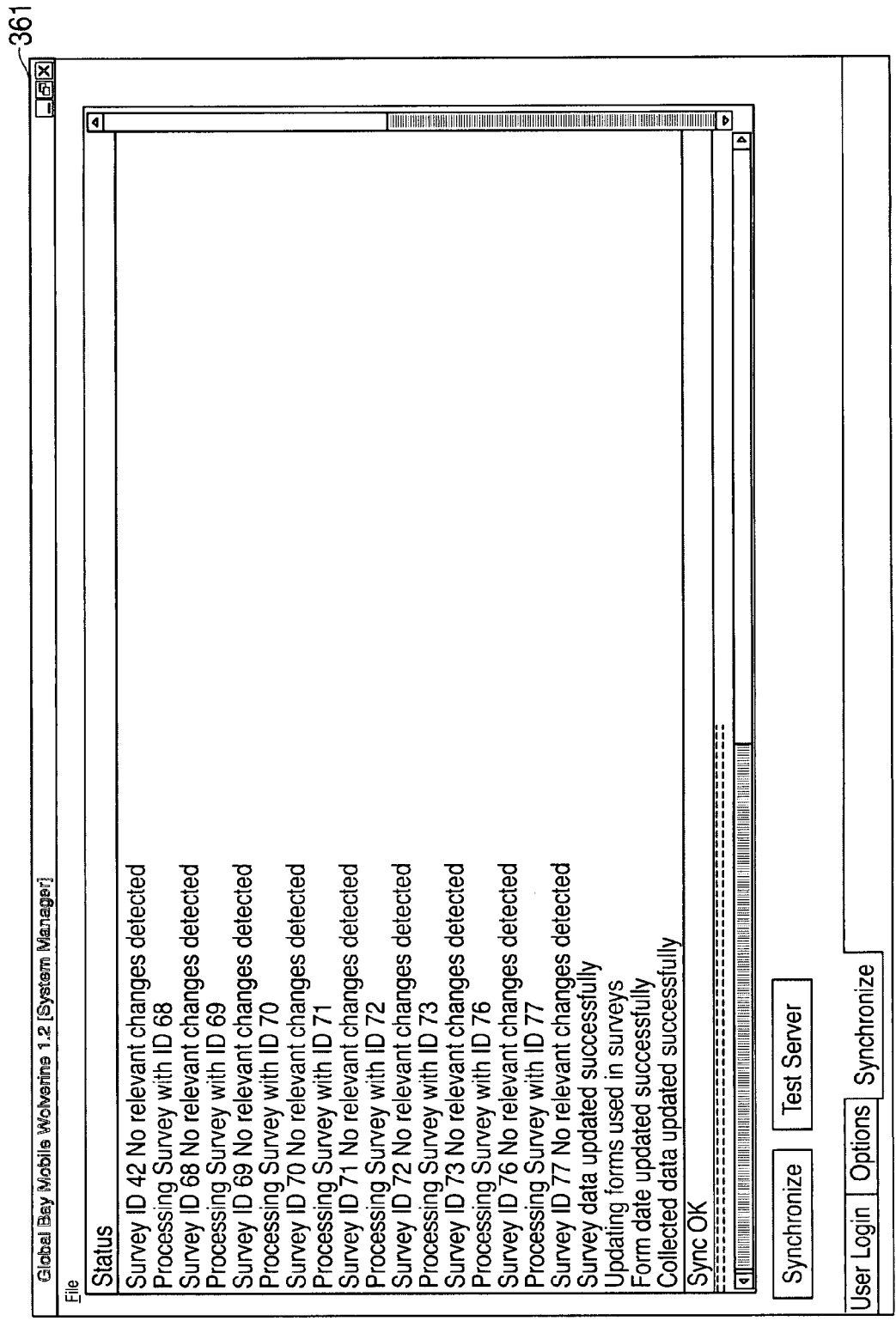
FIG. 18 is an illustration of a "web shot" as utilized by the "synchronization server" component of a mobile data collection and management system, according to an embodiment of the present invention.

Referring now to FIG. 18, a screen shot 361 shows the synchronization status after a synchronization has been run. The synchronization application is run by clicking the "Synchronize" tab and then clicking the "Synchronize" button. The list of text that appears in the screen shot is indicative that syncing is occurring correctly. As shown, at the end of the synchronization process, five line items appear that verify syncing has occurred. The line item "Survey data uploaded successfully" indicates that the survey(s) stored on the mobile device have been updated successfully (i.e., occurs when and if a new version resides on the server). The line item "Updating forms used in surveys" indicates that the forms used by the survey(s) stored on the mobile device are being updated with any new versions that reside on the server. The line item "Form data updated successfully" indicates that the forms used by the survey(s) stored on the mobile device have been updated successfully (i.e., occurs when and if a new version resides on the server). The line item "Collected data updated successfully indicates that data collected from the mobile device has been sent to the Synchronization Server. The last line item "Sync OK" indicates that all syncing processes have occurred without error.

Figure 19:
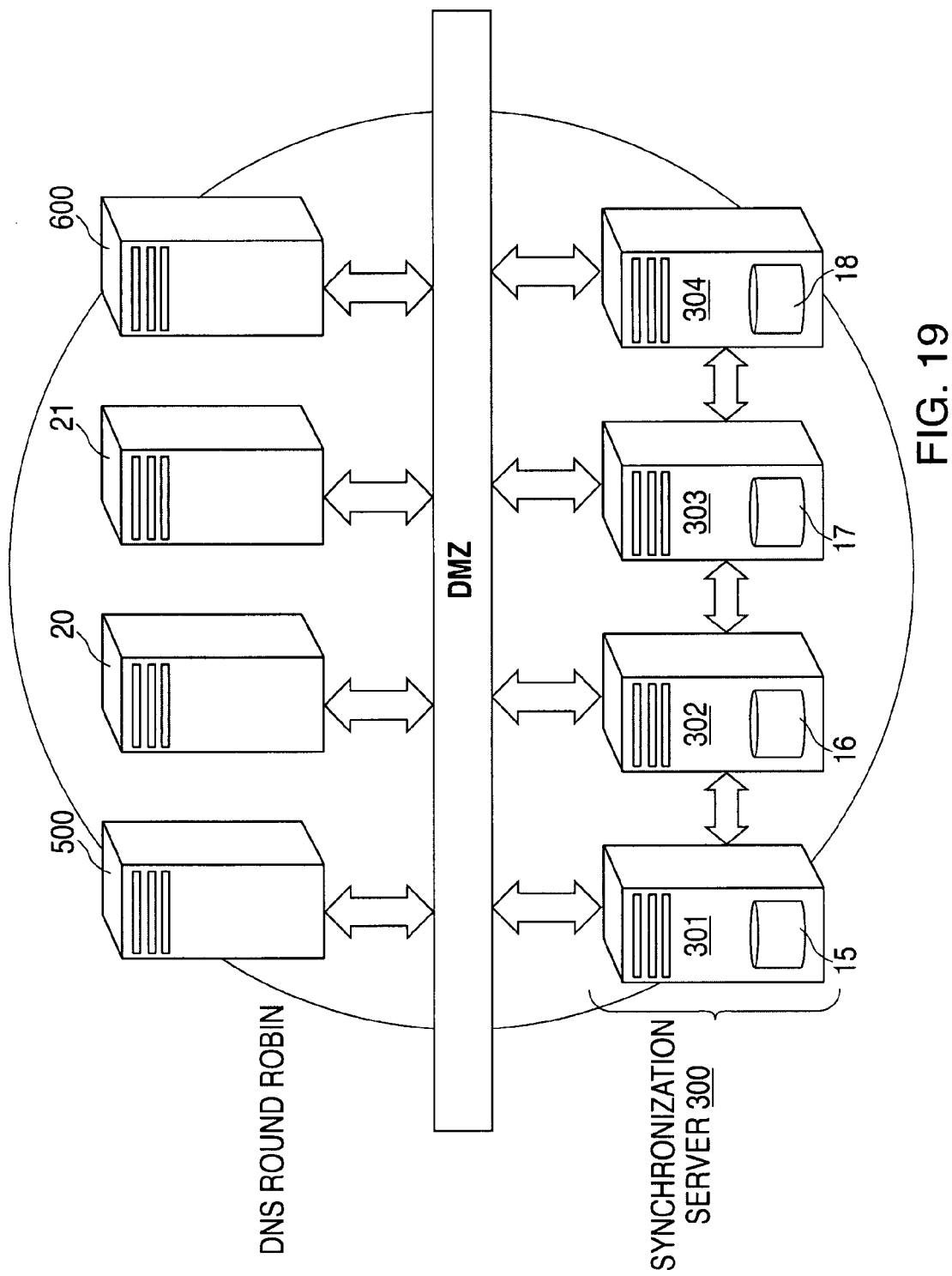
FIG. 19 is an illustration of a model of distributed synchronization as carried out by the "synchronization server" component of a mobile data collection and management system, according to an embodiment of the present invention.

Referring now to FIG. 19, an exemplary synchronization controlled by the mobile data collection and management system architecture's Synchronization Server component 300 is shown in conjunction with central and organizational servers. In this example, it is shown that there can be multiple servers 301, 302, 303 and 304, each having an independent database 15, 16, 17 and 18. Thus it is to be understood that the Synchronization Server has scalability in that there can be Primary and Secondary Sync Servers. In addition in this example, it is shown that additional components, such as mobile device 500, central server 20, organization's server 21 and a $3^{rd}$ party application/system can be synchronized. Thus it is to be understood that the system can support both distributed and non-distributed computing models.

Synchronization occurs by and between each of the multiple servers 301, 302, 303 and 304 and then to each of the other components. Once data has successfully reached the mobile client it is kept in a secure manner by compressing and encrypting. For example, an encryption algorithm that can be used is a Blowfish 128-bit block cipher encryption, and a data compression that can be used is the zLib compression method (i.e., a variant of the LZ77, called deflation, which emits compressed data as a sequence of blocks). Such is done to ensure that data is transmitted securely without information loss between the present invention's Server 300 and the present invention's Mobile Client 500. In addition, there is an option to "Smart-Sync", that is synchronize only deltas from records. Such option allows for a reduction in the amount of data traffic.

Figure 20:
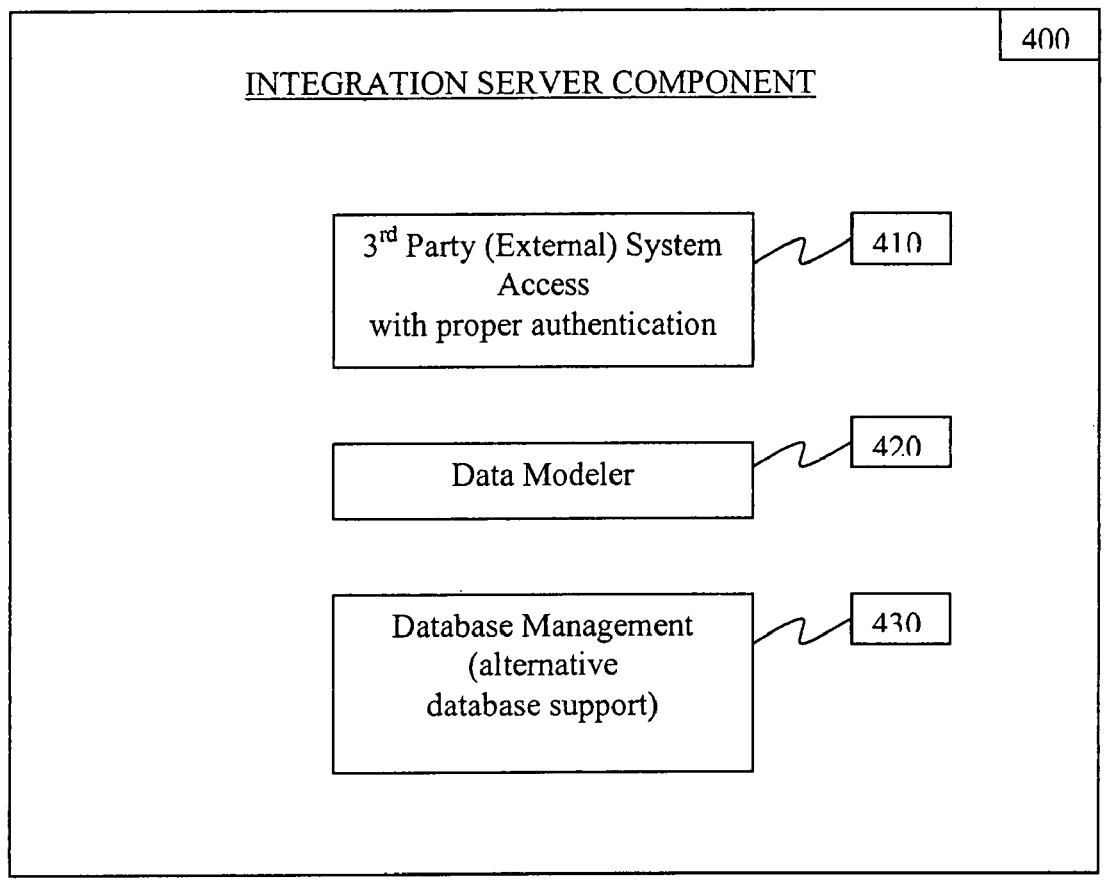
FIG. 20 is an illustration of a methodology by which external access to the collected and versioned data and modeling/mapping of such data occurs as performed by the "integration server" component of a mobile data collection and management system, according to an embodiment of the present invention.

Referring now to FIG. 20, the Integration Server component 400 allows external systems to access and share the data that is stored in the mobile data collection and management system architecture 10 of the present invention. The "engine" of the "integration server" includes a proprietary Database Management System (DBMS—not shown) that stores all data collected from the mobile devices in the field. The DBMS uses Java Database Connectivity technology and a standard SQL database access interface, enabling it in step 410 to be compatible with third party applications and existing infrastructure. Thus the Integration Server component 400 allows for data, business rules, validations and user interfaces to be "Pushed" and "Pulled" into the system by $3^{rd}$ party systems. This is done through XML messages over HTTP. All data accesses require proper authentication and correct acknowledgment to exchange data. All messages are transactional to ensure data integrity.

In step 420, the mobile data collection and management system architecture 10 of the present invention includes a data modeler. The data modeler allows a user to map fields between an external system/database and data fields within the present invention's mobile data collection and management system architecture. Thus, after the connection is established, the $3^{rd}$ party system user will be able to view the different databases/tables/fields that are available. The Data Modeler also allows creation of a link between the present invention and an external system and supports two modes: 1. the present invention to external system and 2. external system to the present invention.

Once the fields have been mapped between the external system and the present invention using the Data Modeler, the mobile data collection and management system architecture of the present invention then processes and understands the external system database tables and it's relationships. Next the present invention creates the same tables within the present invention and is then ready to use by the Form Builder. Finally, the user can create applications based on the tables of the external system. All functionality can be done without writing any line of code.

Lastly, in step 430, the Integration Server component 400 also includes an alternative database support for further backend integration and support for XML feeds and other data outputs for advanced reporting and application integration.

Figure 21:
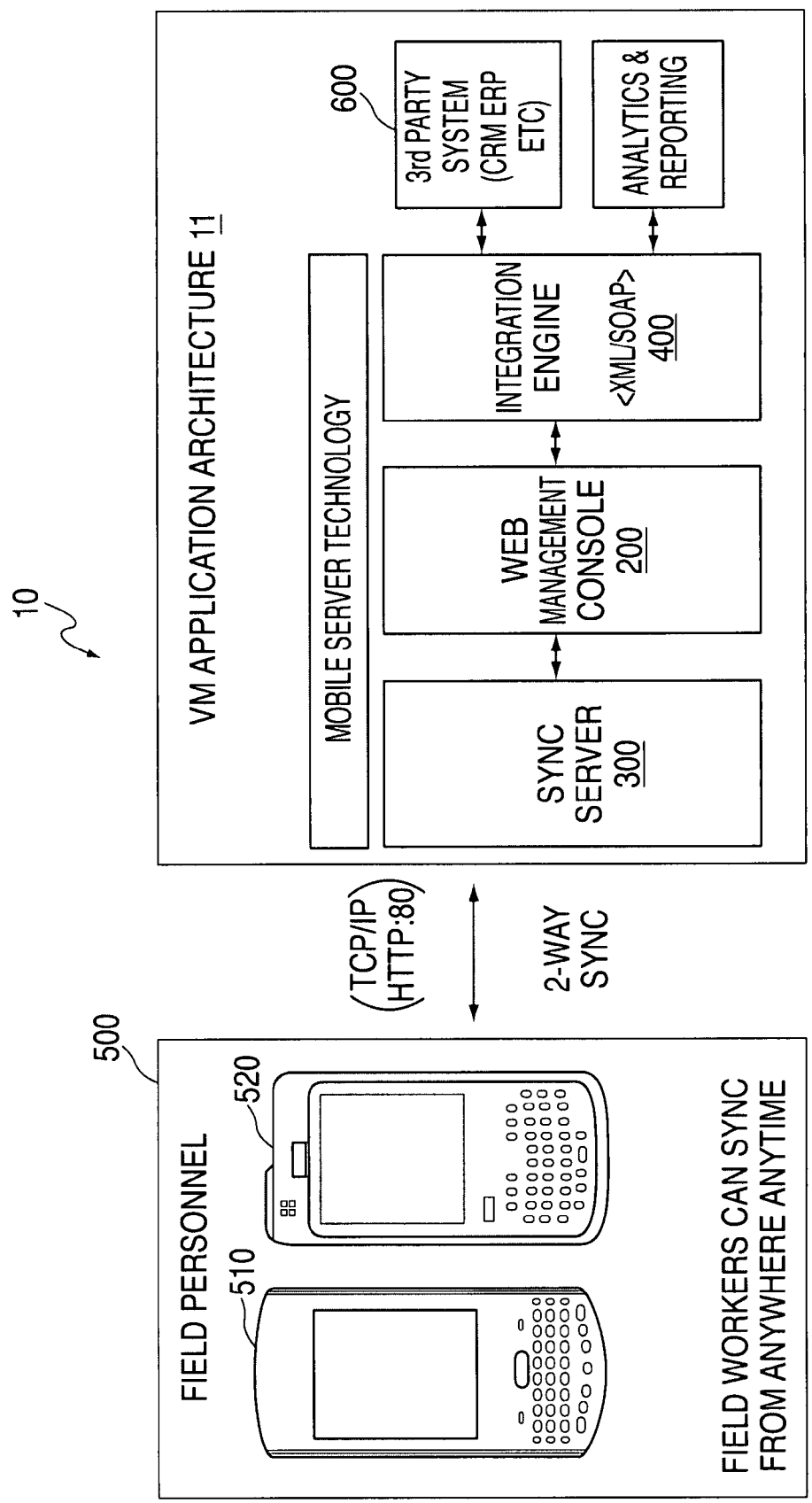
FIG. 21 is an illustration of an example of the middleware application architecture of a mobile data collection and management system, according to an embodiment of the present invention.

Referring back to FIGS. 1 and 2 and additionally to FIG. 21, the Mobile Client component 500 comprises individual mobile devices 501, 502, 503, 510 and 520 and the mobile software applications that resides on such devices. The mobile devices can be any device on which an application that has been authored by the Form Builder component 100 can be run (i.e., devices such as a PDA, a Desktop, a Tablet, etc.). As mentioned, a Mobile Client software application that is capable of supporting the Form Builder component application is resident on each mobile device. Such placement allows for leveraging both data collection on a mobile basis at the device and management of data, forms and surveys through the system architecture's virtual machine technology. In this manner then cross-platform support and compatibility for all solutions deployed on the system is attainable.

Referring now specifically to FIG. 21, an example of the middleware application architecture of a mobile data collection and management system 10 and its utilization is shown. The present's invention's middleware, as it has been written in the computer software language of C++, allows implementation of a Virtual Machine (VM) architecture 11. The applications of VM 11 are deployed independently of each other and those needed to make a mobile solution work and thus can be stored on independent computer servers and/or databases (not shown). Thus, in this implementation example, the Form Builder component, or mobile server technology 100, resides independently of the mobile devices 510 and 520 of the mobile client component 500. Updates of the server technology or synchronization of the data collected by the field personnel is directed by the synchronization server component 300. Control over when synchronization occurs comes from input by the system management through the web management console 200. Access by $3^{rd}$ Party Systems 600 to and the capability to run analytics and reports of the data stored by the system 10 is via the Integration Engine Server 400.

With regard to security of the system 10, both the Synchronization Server component 300 and the Integration Server component 400 require proper authentication against a users access to a database and such authentication must correctly acknowledge each request.

In addition system and database access can be established and controlled for individuals and groups through an interlocking system of roles and privileges. Role-based access to build, edit, change forms, deploy and manage users and access to other tools and functionality can be determined by the individual's role. Unnecessary options can be hidden from the system user, greatly simplifying the present invention's use and over the data collection process.

Also in addition, administration and security control can be established and distributed such that individual and group Web authoring relies upon a unique tiered security system consisting of site administrators, departmental administrators and individual content creators. This functionality allows for effective distribution and management of security privileges.

Thus as can be seen from the above description, the present invention facilitates development and solutions to a wide variety of concerns and obstacles to the introduction of mobile applications today. The present invention accomplishes the solutions through use of underlying technology, a variety of features, usability, acceptability by end users and of course ease of deployment and upkeep. By use of industry standards, the present invention shows how an organization can go from taking their backend and paper forms to robust and powerful mobile applications in weeks rather than months without being tied into specific technologies and having the flexibility of easy portability.

With the use of an end-to-end solution like that disclosed by the present invention, an organization can eliminate any downfalls associated with using a smart client application approach due to its rapid deployment and ease of upgrade capabilities. An application can be developed by a non-technical user which would eliminate the need to hire anyone new with the appropriate skill set.

In the foregoing description, the method and apparatus of the present invention have been described with reference to specific examples. It is to be understood and expected that variations in the principles of the method and apparatus herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. A method of collecting and managing data on a mobile client device and at least one server, the method comprising the steps of:
   utilizing a form builder component having three operative interface pieces by which to create a template form, a data collection survey and a business rule application;
   utilizing a web application component having three separate management abilities by which to manage a system user, the template form, the data collection survey, the business rule application and collected data; and
   utilizing a synchronization server component to control both a synchronization between the mobile client device and the at least one server by a secure transmission and a storage of the template form, the data collection survey, the business rule application, and collected data,
   wherein data is entered into at least one of the template form, data collection survey and the business rule application.

2. The method according to claim 1, further comprising the step of:
   utilizing an integration server component to control at least one of the access and sharing of the collected data.

3. The method according to claim 2, wherein the step of utilizing an integration server component to control the access or sharing of the collected data further comprises at least one of the steps of:
   mapping data fields to an external system; and
   allowing a 3$^{rd}$ party to "push" and "pull" collected data, business rules, validations and user interfaces.

4. The method according to claim 1, wherein the step of utilizing the form builder component to create at least one of the template form, the data collection survey and the business rule application further comprises at least one of the steps of:
   designing a template form;
   choosing a template form; and
   editing an existing template form,
   wherein such steps are performed via a template editor operative interface piece.

5. The method according to claim 1, wherein the step of utilizing the form builder component to create at least one of the template form, the data collection survey and the business rule application further comprises at least one of the steps of:
   create a new data collection survey;
   load a list of stored template forms for use in the newly created data collection survey;
   set object properties in at least one of the stored template forms or newly created data collection survey;
   edit the newly created data collection survey; and
   save the newly created data collection survey,
   wherein such steps are performed via a survey builder operative interface piece.

6. The method according to claim 1, wherein the step of utilizing the form builder component to create at least one of the template form, the data collection survey and the business rule application further comprises at least one of the steps of:
   load a dataset comprising a list of dataset questions;
   provide attributes to the dataset questions;
   create dataset answers; and
   set properties by specifying preferences,
   wherein such steps are performed via a survey builder operative interface piece.

7. The method according to claim 1, wherein the step of utilizing the form builder component to create at least one of the template form, the data collection survey and the business rule application further comprises at least one of the steps of:
   define logic;
   manipulate control properties;
   set validations;
   filter lists;
   define jumps;
   define data save points; and
   populate controls with value,
   wherein such steps are performed via a script creator operative interface piece.

8. The method according to claim 1, wherein the step of utilizing a web application component by which to manage at least one of the system user, the template form, the data collection survey, the business rule application and collected data further comprises at least one of the steps of:
   create a system user or system user group;
   edit a system user or system user group;
   associate a system user or system user group to at least one of the template form, the data collection survey and the business rule application;
   viewing and editing of the collected data in at least one of the template form, the data collection survey and the business rule application;
   controlling access to at least one of the template form, the data collection survey and the business rule application;
   exporting the collected data from at least one of the template form, the data collection survey and the business rule application; and
   running reports on the collected data from at least one of the template form, the data collection survey and the business rule application.

9. The method according to claim 1, wherein the step of utilizing a synchronization server component to control a secure transmission or storage of at least one of the template form, the data collection survey, the business rule application, and collected data further comprises at least one of the steps of:
   storing and backing up the collected data;
   synchronizing the collected data;
   versioning the template form, the data collection survey, the business rule application and the collected data; and
   resolving conflicts as between the template form, the data collection survey, the business rule application and the collected data.

10. The method according to claim 1, further comprising the step of:
    utilizing a mobile client component by which at least one of the template form, the data collection survey and the business rule application is run.

11. A data collection and management system on a mobile client device and at least one server, comprising:
    a Form Builder component having three operative interface pieces to create a template form, data collection survey and business rule application;
    a Web Application component having three separate management abilities to manage a system user, the template form, data collection survey and business rule application, and collected data;
    a Synchronization Server component to control both a synchronization between the mobile client device and the at least one server by a secure transmission and storage of the template form, the data collection survey, the business rule application, and collected data,
    wherein data is entered into at least one of the template form, data collection survey and the business rule application.

12. The data collection and management system according to claim 11, wherein the secure transmission, storage, access or sharing of at least one of the template form, the data collection survey, the business rule application, and collected data is via at least one of the steps of:
- storing and backing up the collected data; synchronizing the collected data;
- versioning the template form, the data collection survey, the business rule application and the collected data;
- resolving conflicts as between the template form, the data collection survey, the business rule application and the collected data;
- mapping data fields to an external system; and
- allowing a 3$^{rd}$ party to "push" and "pull" collected data, business rules, validations and user interfaces.

13. The data collection and management system according to claim 11, further comprising:
- an Integration Server component to control access and sharing of the entered data.

14. The data collection and management system according to claim 11, further comprising:
- a Mobile Client component on which at least one of the template form, data collection survey and business rule application is run.

15. The data collection and management system according to claim 11, wherein the template form is created via at least one of the steps of:
- designing a template form;
- choosing a template form; and
- editing an existing template form.

16. The data collection and management system according to claim 11, wherein the data collection survey is created via at least one of the steps of:
- create a new data collection survey;
- load a list of stored template forms for use in the newly created data collection survey;
- set object properties in at least one of the stored template forms or newly created data collection survey;
- edit the newly created data collection survey; and
- save the newly created data collection survey.

17. The data collection and management system according to claim 11, wherein the data collection survey is created via at least one of the steps of:
- load a dataset comprising a list of dataset questions;
- provide attributes to the dataset questions;
- create dataset answers; and
- set properties by specifying preferences.

18. The data collection and management system according to claim 11, wherein the business rule application is created via at least one of the steps of:
- define logic;
- manipulate control properties;
- set validations;
- filter lists;
- define jumps;
- define data save points; and
- populate controls with value.

19. The data collection and management system according to claim 11, wherein management of at least one of system user, the template form, the data collection survey, the business rule application and the collected data is accomplished via at least one of the steps of:
- create a system user or system user group;
- edit a system user or system user group;
- associate a system user or system user group to at least one of the template form, the data collection survey and the business rule application;
- viewing and editing of the collected data in at least one of the template form, the data collection survey and the business rule application;
- controlling access to at least one of the template form, the data collection survey and the business rule application;
- exporting the collected data from at least one of the template form, the data collection survey and the business rule application; and
- running reports on the collected data from at least one of the template form, the data collection survey and the business rule application.

\* \* \* \* \*